US008311322B2

(12) United States Patent
Ashikaga

(10) Patent No.: US 8,311,322 B2
(45) Date of Patent: Nov. 13, 2012

(54) IMAGE PROCESSING APPARATUS, IMAGE PROCESSING METHOD, AND COMPUTER READABLE MEDIUM

(75) Inventor: Hideaki Ashikaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 910 days.

(21) Appl. No.: 12/372,897

(22) Filed: Feb. 18, 2009

(65) Prior Publication Data
US 2010/0074517 A1 Mar. 25, 2010

(30) Foreign Application Priority Data
Sep. 25, 2008 (JP) .................................. 2008-245775

(51) Int. Cl.
G06K 9/00 (2006.01)
(52) U.S. Cl. ....................................................... 382/164
(58) Field of Classification Search .................. 382/100, 382/162, 164–165, 181, 190, 209, 218–222, 382/232, 278; 380/200, 243, 247; 705/50, 705/57–59; 707/712; 713/176, 179; 715/202, 715/240–243
See application file for complete search history.

(56) References Cited

U.S. PATENT DOCUMENTS

| 5,721,788 A * | 2/1998 | Powell et al. ............... 382/100 |
| 2007/0286497 A1 | 12/2007 | Podilchuk |
| 2008/0031549 A1 | 2/2008 | Konishi et al. |
| 2008/0123901 A1 | 5/2008 | Podilchuk |

FOREIGN PATENT DOCUMENTS

| JP | 09-245183 A | 9/1997 |
| JP | 2001-202392 A | 7/2001 |
| JP | 2004-178002 A | 6/2004 |
| JP | 2004-213230 A | 7/2004 |
| JP | 2004-287682 A | 10/2004 |
| JP | 2004-341914 A | 12/2004 |
| JP | 2006-185027 A | 7/2006 |
| JP | 2006-201885 A | 8/2006 |
| JP | 2007-041832 A | 2/2007 |
| JP | 2007-221293 A | 8/2007 |
| JP | 2007-241356 A | 9/2007 |
| JP | 2008-046833 A | 2/2008 |
| JP | 2008-059546 A | 3/2008 |

OTHER PUBLICATIONS

Japanese Office Action issued on Sep. 21, 2010 in the corresponding Japanese Patent Application No. 2008-245775.
Japanese Notification of Reason for Refusal, dated Feb. 25, 2011, issued in Application No. 2008-245775.
Tomohiro Nakai et al. "A Method of Annotation Extraction from Documents Using Alignment Based on Local Arrangements of Feature Points", The Institute of Electronics, Information and Communication Engineers, Japan, Mar. 8, 2007, vol. 106, No. 605, pp. 61-66.
Aaron Langille et al. "An Efficient Match-based Duplication Detection Algorithm", Proceedings of the 3rd Canadian Conference of Computer and Robot Vision, IEEE, Jun. 7, 2006, pp. 1-8.

(Continued)

Primary Examiner — Jose Couso
(74) Attorney, Agent, or Firm — Sughrue Mion, PLLC

(57) ABSTRACT

An image processing apparatus includes: an image dividing unit; a corresponding divided image extract unit; a difference extract unit; a first change unit; a second change unit; and an image output unit.

6 Claims, 21 Drawing Sheets

OTHER PUBLICATIONS

Shenggen Ju et al., "An Authentication Method for Copy Areas of Images", Fourth International Conference on Image and Graphics, IEEE, Aug. 1, 2007, pp. 303-306.

Alin C Popescu et al., "Exposing Digital Forgeries by Detecting Duplicated Image Regions", Dartmouth College Computer Science, 2004, pp. 1-11.

Aaron Langille et al., "An Efficient Match-Based Duplication Detection Algorithm", Proceedings of the $3^{rd}$ Canadian Conference on Computer and Robot Vision, IEEE, 2006, pp. 1-8.

Tran Van Lanh et al., "A Survey on Digital Camera Image Forensic Methods", International Conference on Multimedia and Expo, 2007, pp. 16-19.

Extended European Search Report dated May 12, 2009.

* cited by examiner

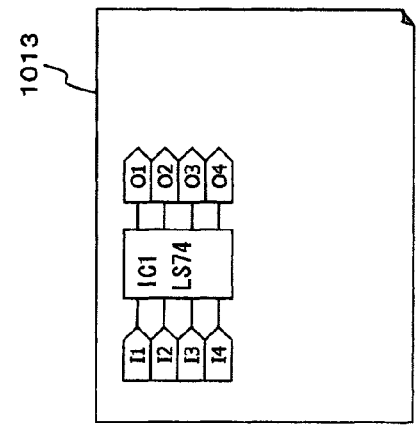
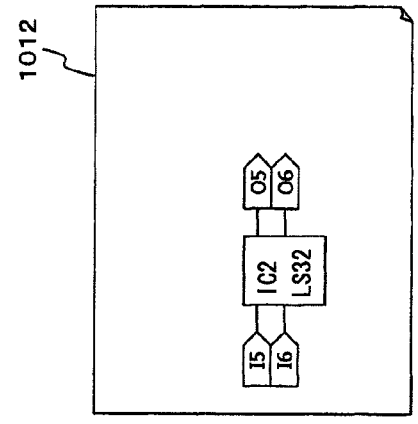
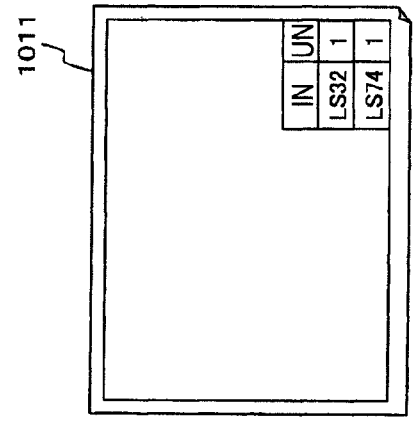
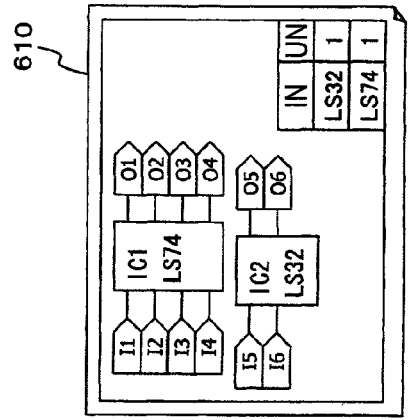

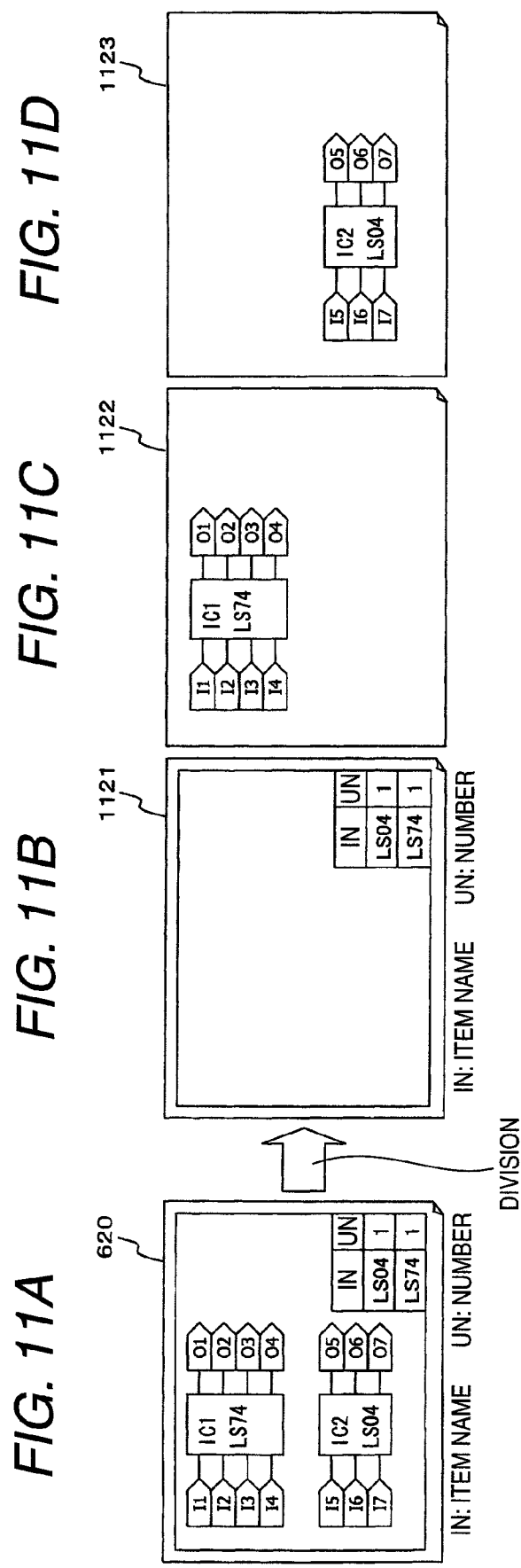

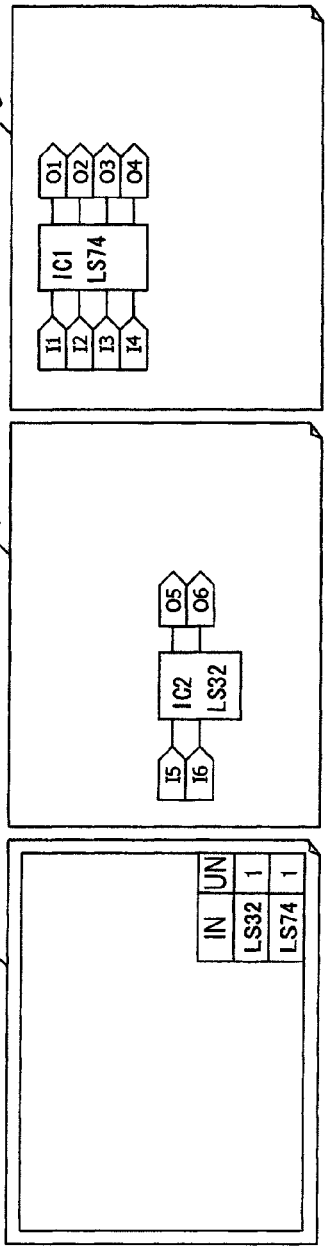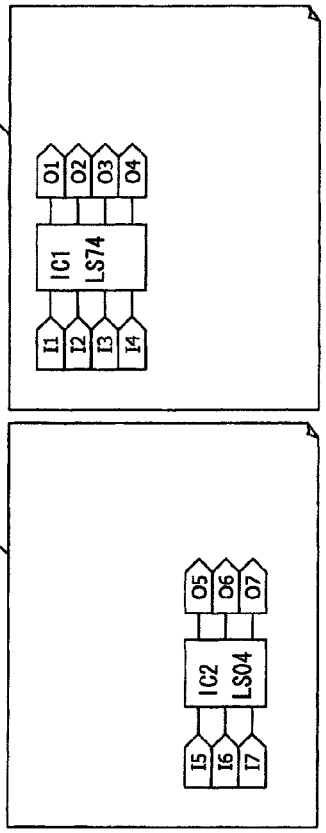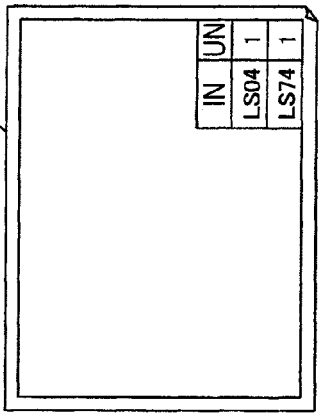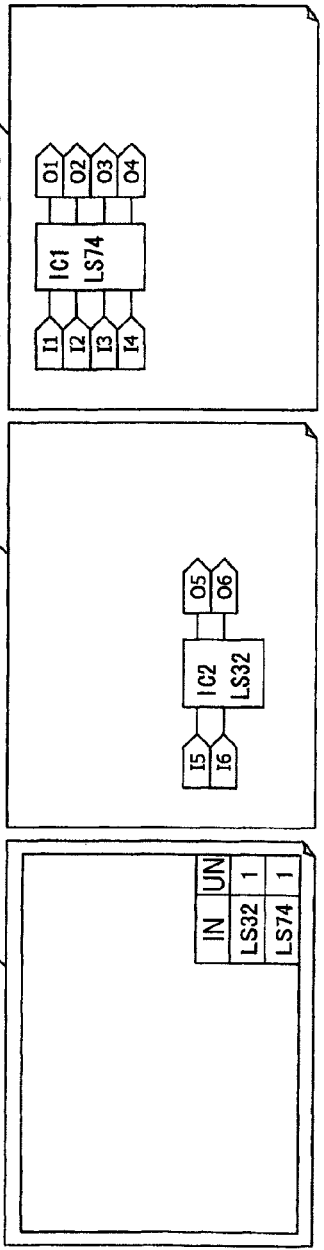

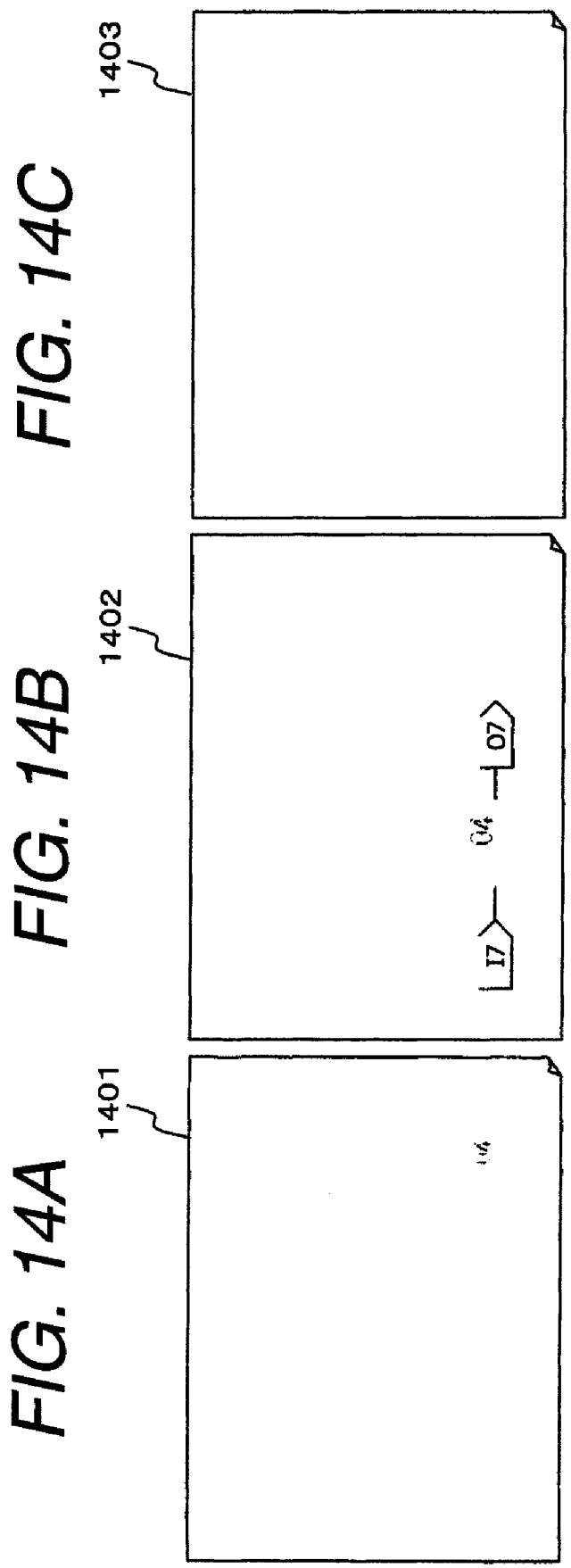

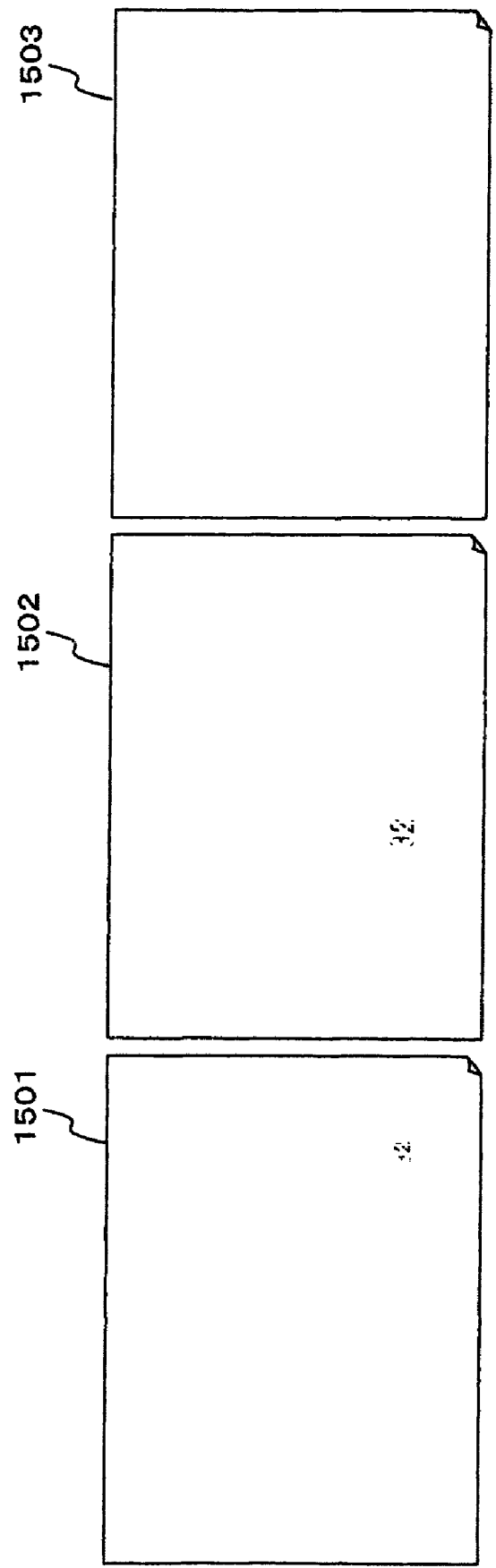

IN: ITEM NAME   UN: NUMBER

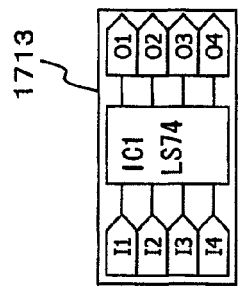
FIG. 17D
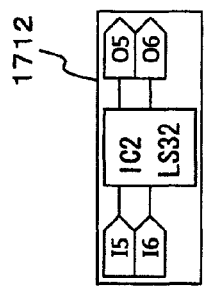
FIG. 17C
FIG. 17B
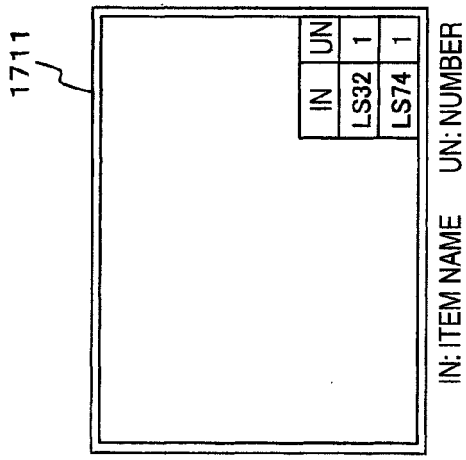
FIG. 17A
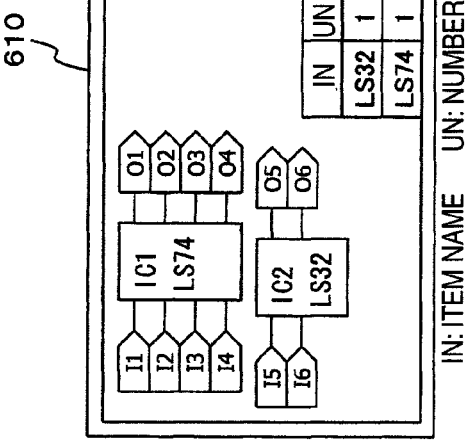

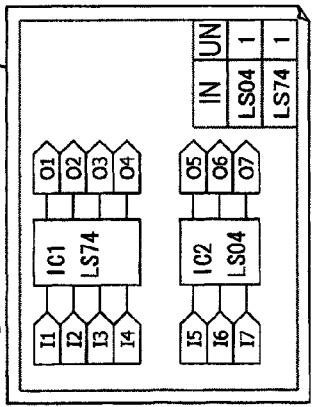
FIG. 22A
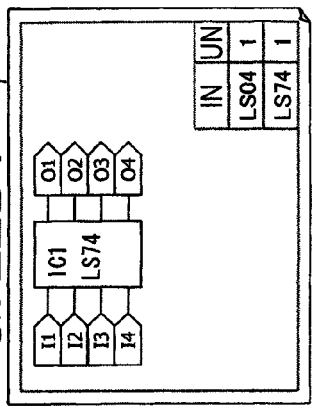
FIG. 22B1
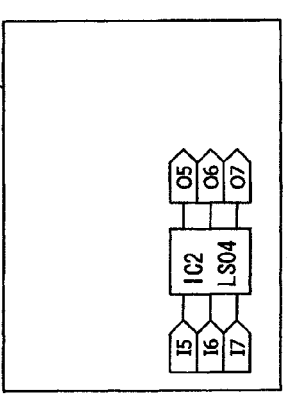
FIG. 22B2
IN: ITEM NAME  UN: NUMBER
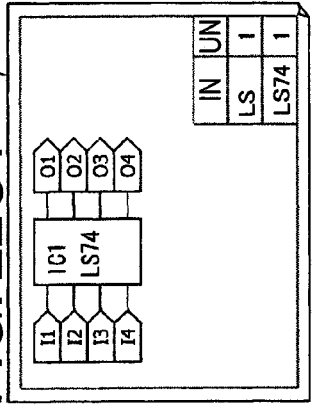
FIG. 22C1
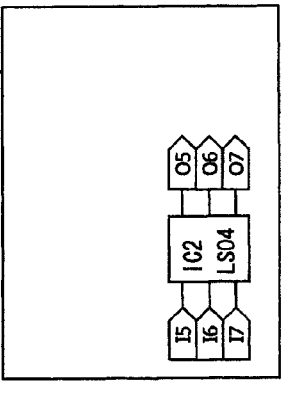
FIG. 22C2
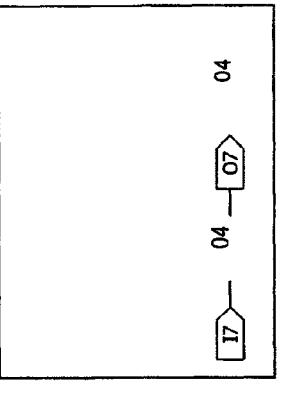
FIG. 22C3

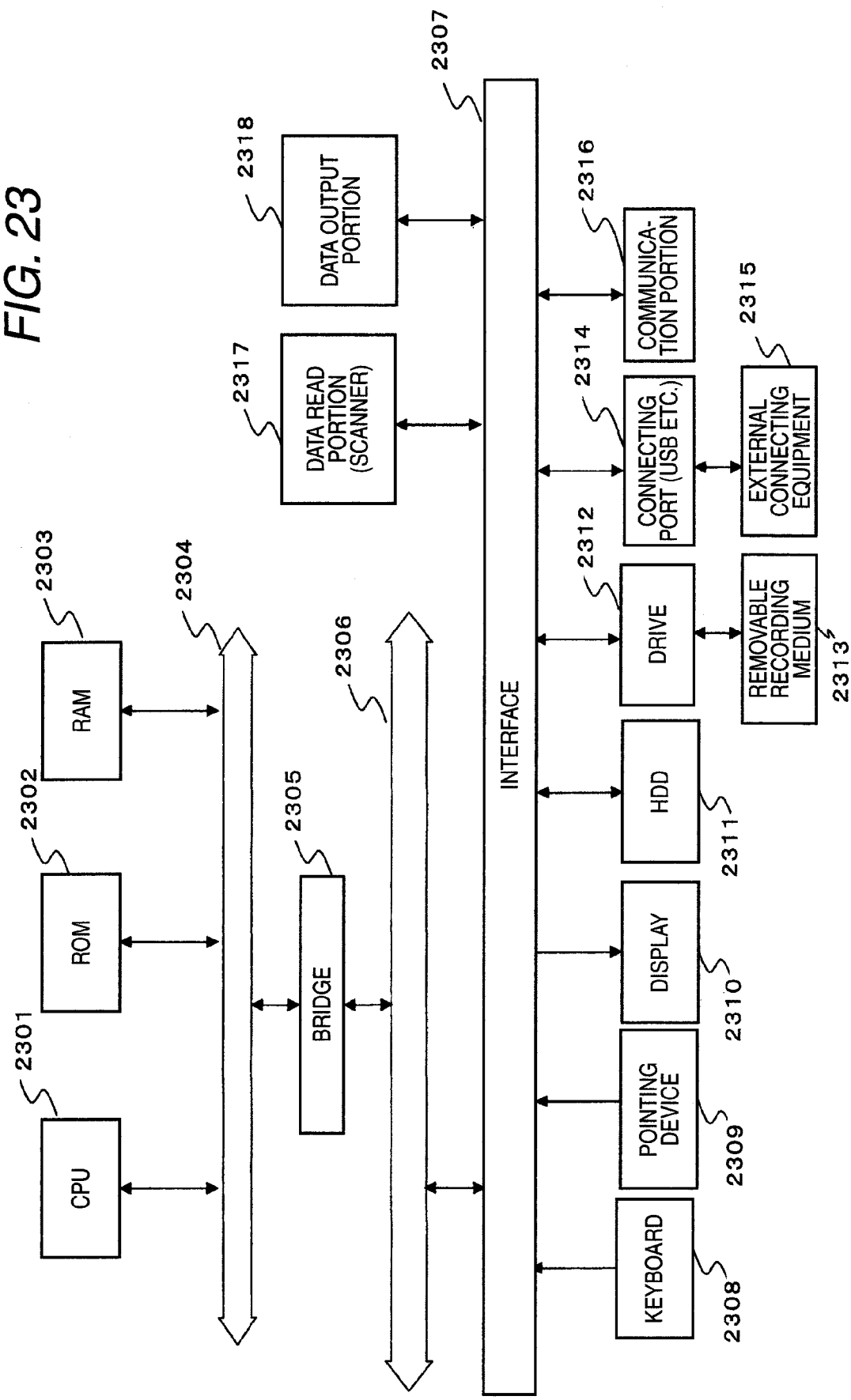

IMAGE PROCESSING APPARATUS, IMAGE PROCESSING METHOD, AND COMPUTER READABLE MEDIUM

CROSS-REFERENCE TO RELATED APPLICATIONS

This application is based on and claims priority under 35 U.S.C. 119 from Japanese Patent Application No. 2008-245775 filed Sep. 25, 2008.

BACKGROUND

1. Technical Field

The present invention relates to an image processing apparatus, an image processing method, and a computer readable medium.

2. Related Art

In order to detect additional entry or the like made by a user on a document using paper as its medium, or in order to check whether a security document is falsified or not, or in order to compare an original drawing with a drawing after corrected, there is a demand for clarifying the changed portions of the document such as additional entry or deletions. In order to cope with this demand, there is carried out a processing in which the original and a paper document (a document to be compared with the original, that is, a document in which there is a possibility that additional entry or the like has been made) are read using a scanner, and the images of the two are compared with each other to extract a difference between them.

SUMMARY

According to an aspect of the present invention, an image processing apparatus includes: an image dividing unit that divides a first image and a second image into a plurality of first divided images and a plurality of second divided images, respectively; a corresponding divided image extract unit that extracts the second divided images corresponding to the first divided images; a difference extract unit that extracts a difference image having a difference generated due to additional entry or extraction between pixels included within each of the first divided images and pixels included within each of the second divided images; a first change unit that, in a case where the first divided images has such a movement relationship that it can be moved relative to the second divided images, changes a color of the second divided images into a first color; a second change unit that changes a color of the difference image extracted by the difference extract unit into a second color; and an image output unit that outputs the second divided images with the color changed by the first change unit and the difference image with the color changed by the second change unit.

BRIEF DESCRIPTION OF THE DRAWINGS

Exemplary embodiment of the present invention will be described in detail based on the following figures, wherein:

FIGS. 10A to 10D are explanatory views of an example of a processing to be executed on a before-corrected image by a block division module;

FIGS. 11A to 11D are explanatory views of an example of a processing to be executed on an after-corrected image by the block division module;

FIGS. 13A1 to 13C3 are explanatory views of an example of a processing to be executed by a block inside positioning module;

FIGS. 14A to 14C are explanatory views of an example of a first processing to be executed by a difference extract module;

FIGS. 15A to 15C are explanatory views of an example of a second processing to be executed by the difference extract module;

FIGS. 17A to 17D are explanatory views of another processing example to be executed on the before-corrected image by the block division module;

FIGS. 22A to 22C3 are explanatory views of an example of a processing to be executed by the present embodiment; and FIG. 23 is a block diagram of an example of a hardware structure of a computer for realizing the present embodiment.

DETAILED DESCRIPTION

Now, description will be given below of a preferred embodiment for realizing the invention with reference to the accompanying drawings.

Figure 1:
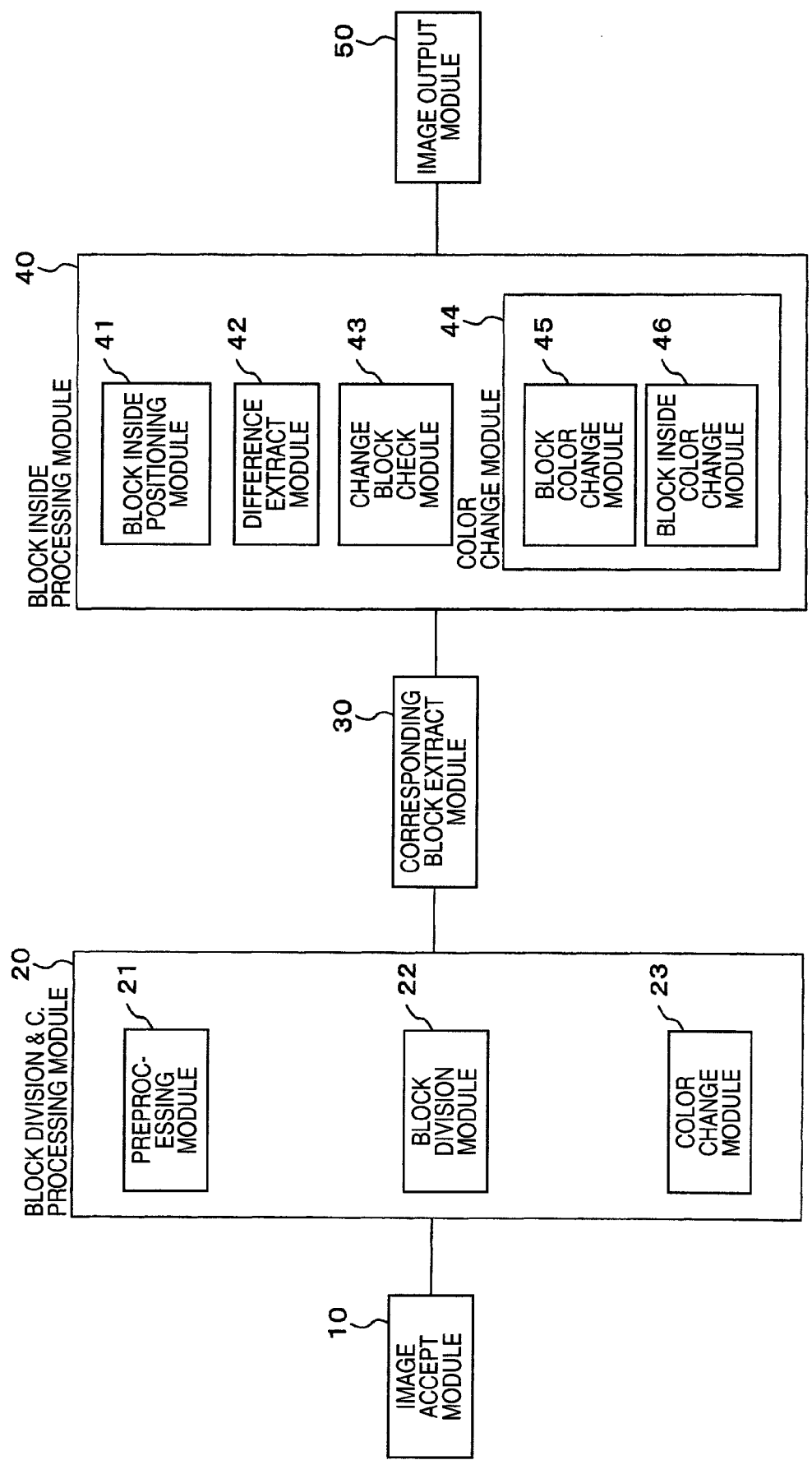
FIG. 1 is a conceptual structure view of modules according to an embodiment of the invention.

FIG. 1 shows a conceptual module structure view of a structure according to the present embodiment.

Here, a module, generally, designates a part which can be separated logically, such as software (computer program) and hardware. Therefore, the term "module" in the present embodiment means not only a module in the computer program but also a module in a hardware structure. Accordingly, the description of the present embodiment covers the computer program, system and method. However, although, for the sake of explanation, there are used the terms "store", "allow something to store something", and terms equivalent to them, these terms, in the case of the computer program, are used to mean that a memory device is allowed to store something or the program controls some part to allow the memory device to store something. Also, although a module corresponds to a function one for one, in actual mounting, a module may be composed of a program, two or more modules may be composed of a program, or, inversely, a module may be composed of two or more programs. Also, two or modules may be executed by a computer, or a module may be executed by two or more computers in a discrete or parallel environment. Here, a module may include another module. Also, in the following description, the term "connection" is used for physical connection and also for logical connection (such as the transfer of data, the instruction of data and the reference relationship between data).

Also, the term "system" or "apparatus" includes a structure in which a plurality of computers, hardware, apparatus and the like are connected together by communication unit such as a network (including a one-to-one correspondence communication connection), and also a structure which can be realized by a computer, or a piece of hardware, or an apparatus or the like. "Apparatus" and "system" are used as terms which are synonymous with each other. The term "predetermined" means "before execution of a processing to be executed". Specifically, it means before a processing according to the present embodiment is started; and, even after the processing according to the embodiment, according to the then condition or state, or, according to the condition or state until then.

Now, description will be given below mainly of the drawings as the examples of the images that are to be processed according to the present embodiment. In a CAD (Computer Aided Design or the like which generates a drawing, it is easy to move an object which is the aggregate of figure elements included in the drawing; and, there is a possibility that the object has moved regardless of the intention of the user of the CAD. The present embodiment, for example, is used to extract the revised portion of the object in the drawing, the moved object and the revised portions of the moved object as differences; and, the present embodiment is also used to output the moved object and the revised portion of such object in different modes.

The present embodiment, as shown in FIG. 1, includes an image accept module 10, a block division & c. processing module 20, a corresponding block division extract module 30, a block inside processing module 40, and an image output module 50.

The image accept module 10 is connected to the block division & c. processing module 20. Specifically, the image accept module 10 accepts an image and passes it to the block division & c. processing module 20. Here, the expression "to accept an image" contains "to read in an image using a scanner", "to receive an image by fax", "to read out an image from an image data base or the like, and other similar operations. The number of such image will be discussed while illustrating two images to be compared, but it may also be three or more images. As the content of the image, there may be used a drawing, a document used for business, a pamphlet for an advertisement, and the like. Also, the image may also be a binary image, a multi-valued (including color) image, and the like. The following description will be given using the binary images of two sheets of drawings. Here, when the color is changed in an intermediate processing, the binary images are turned into multi-valued images. Also, a first image, or one of the two images is referred to as an image before revised and a second image, or the other is referred to as an image after revised, and vice versa. Further, the two images need not always be the images that are generated due to revision. In other words, the two images may not always be dependent on a single piece of image but two images to be accepted by the image accept module 10 may be images which are independent of each other.

The block division & c. processing module 20 is connected to the image accept module 10 and corresponding block extract module 30, and it includes a preprocessing module 21, a block division module 22 and a color change module 23. The block division & c. processing module 20 accepts an image from the image accept module 10, divides the image and passes the thus divided images (which are hereinafter referred to as division images or blocks) to the corresponding block extract module 30. Here, there may not also be executed the processings that are to be carried out the preprocessing module 21 and color change module 23.

The preprocessing module 21 carries out a preprocessing on the image accepted by the image accept module 10. Here, the term "preprocessing" includes a noise removing processing, a positioning processing, an expansion/contraction processing for matching the size of one image to that of the other, and other similar processing. Here, the positioning processing is a processing which moves the images in order that marks (for example, cross marks) showing reference positions on the drawing can be made to coincide with each other.

The block division module 22 divides the image that is accepted by the image accept module 10. For example, it receives the first and second images that have been preprocessed by the preprocessing module 21, and divides the respective images into blocks. Here, the term "block" means an image which includes a pixel group, while the pixel group includes at least pixel areas continuing with each other in a 4 connection manner or in an 8 connection manner as well as the aggregate of these pixel areas. The aggregate of the pixel areas means that there are two or more pixel areas continuing in a 4 connection manner or the like and also the two or more pixel areas exist near to each other. Here, the expression "areas existing near to each other" includes, for example, pixel areas which are near to each other in distance (more specifically, pixel areas existing within a predetermined distance), a set of image areas one of which contains the other therein, or image areas that are cut out by a blank spaced from other image areas by a predetermined distance or more.

Also, the block division module 22 may also divide the images into circumscribed rectangles including a pixel group as blocks.

Here, the term "block" is used as a structure which contains the divided pixel areas while other images are formed as blanks, or as a structure which contains the divided pixel areas but does not include other divided pixel areas. That is, the block may have two kinds of sizes: one is equal to the size of the image (the image preprocessed by the preprocessing module 21) accepted by the image accept module 10, while the other is almost equal to the size of the areas including only the divided pixel areas.

The color change module 23 changes the whole shape of the image (the image preprocessed by the preprocessing module 21) accepted by the image accept module 10. For example, the shape includes color, chroma, density, kind (for a line, a solid line, a dotted and the like), and the like. In processings to be executed by a color change module 44, a block color change module 45 and a block inside color change module 46 (which will be respectively discussed later) as well, description will be given while the color is mainly taken as the shape of the image. Also, to change the shape of the image means to change the pixel areas contained in the image;

for example, the black pixels are changed to red pixels, or a straight line is changed to a dotted line.

The corresponding block extract module 30 is connected to the block division & c. processing module 20 and block inside processing module 40. It receives the first and second images from the block division & c. processing module 20 and extracts the blocks of the second image corresponding to the blocks of the first image. For example, the corresponding block extract module 30 may extract, as the corresponding blocks, the blocks of the second image that are similar to the blocks of the first image. Also, when it extracts the characteristics of the blocks of the first image and the characteristics of the blocks of the second image and a difference between the characteristics of the blocks of the first and second images is within a threshold value, it may extract these blocks as the blocks that are similar to each other. In this respect, description will be given later of a more specific example with reference to FIG. 5.

The block inside processing module 40 is connected to the corresponding block extract module 30 and image output module 50; and, it includes a block inside positioning module 41, a difference extract module 42, a change block check module 43 and a color change module 44. Further, the color change module 44 includes a block color change module 45 and a block inside color change module 46. By the way, processing, which are to be carried out by the block inside positioning module 41 and change block check module 43 respectively, may also not be executed. Also, a processing, which is to be carried out by one of the block color change module 45 and block inside color change module 46, may not be executed.

The block inside positioning module 41 positions the blocks respectively extracted by the corresponding block extract module 30. Here, the term "position" means to convert the blocks in such a manner as to increase a ratio where the pixel areas within the corresponding blocks coincide with each other. For example, the term "change" includes an affine transformation (parallel displacement, expansion and contraction, rotation, inclination and the like).

The difference extract module 42 extracts a difference which is generated by entry addition of pixels into the corresponding blocks or by extraction of pixels from the corresponding blocks. For example, the difference extract module 42 subtracts the other block from one block, or performs an exclusive-OR operation on the two blocks. Also, it also may extract a pixel area containing the difference from the corresponding block. Here, referring to the term "difference generated due to entry addition", as the result of addition of entry to one image, this image is turned into the other image; and thus, there is generated an added-entry portion which makes the two images different from each other. That is, the added-entry portion is expressed as a difference generated due to added entry. For example, a drawing or the like, which has been added, corresponds to a difference generated due to added entry. On the other hand, referring to the term "difference generated due to extraction", as the result of deletion of a portion of one image, this image is turned into the other image; and thus, there is generated a deleted portion which makes the two images different from each other. That is, the deleted portion is expressed as a difference generated due to extraction. For example, a drawing or the like, which has been deleted, corresponds to a difference generated due to extraction.

The change block check module 43 checks whether, when one of a block of a second image extracted by the corresponding block extract module 30 and a block of a first image corresponding to the second image block is changed, a portion of the changed block coincides with a portion of the other block or not. For example, as the change operation, there is available an affine transformation.

Also, the change block check module 43 may also check according to the positions within the image of the blocks divided by the block division module 22 whether the two blocks can be moved relative to each other or not.

The color change module 44 changes the color of the image that is processed by the difference extract module 42 or change block check module 43.

The block color change module 45 changes the color of the block of a second image not extracted by the corresponding block extract module 30 into a different color from that of the other image portions. That is, suppose the block of the first image is compared with the block of the second image, when a corresponding block does not exist in the first image, the block color change module 45 considers that the block of the second image has been added, and thus it changes this block into such color to be able to show that the whole of such block has been extracted as a difference. Also, the block color change module 45 may also be structured in the following manner: that is, when the change block check module 43 finds blocks to have such relationship that they coincide with each other, the block color change module 45 changes the blocks having the coinciding relationship into a different color from the remaining image portions. Further, the block color change module 45 may also be structured in the following manner: that is, when the block of the first image has such relationship with the block of the second image that it is movable relative to the second image block, the block color change module 45 changes the block of the second image into a different color from the remaining image portions.

The block inside color change module 46 changes the image having a difference extracted by the difference extract module 42 into a different color from the remaining image portions.

The image output module 50 is connected to the block inside processing module 40. The image output module receives an image with its color changed by the color change module 44, and outputs the image therefrom. The expression "to output the image" contains an operation to print the image using a printing machine such a printer, an operation to display the image on a display device such as a display, an operation to transmit the image using an image transmission apparatus such as a fax machine, an operation to write the image into an image storage such as an image data base, and other similar operations.

Figure 2:
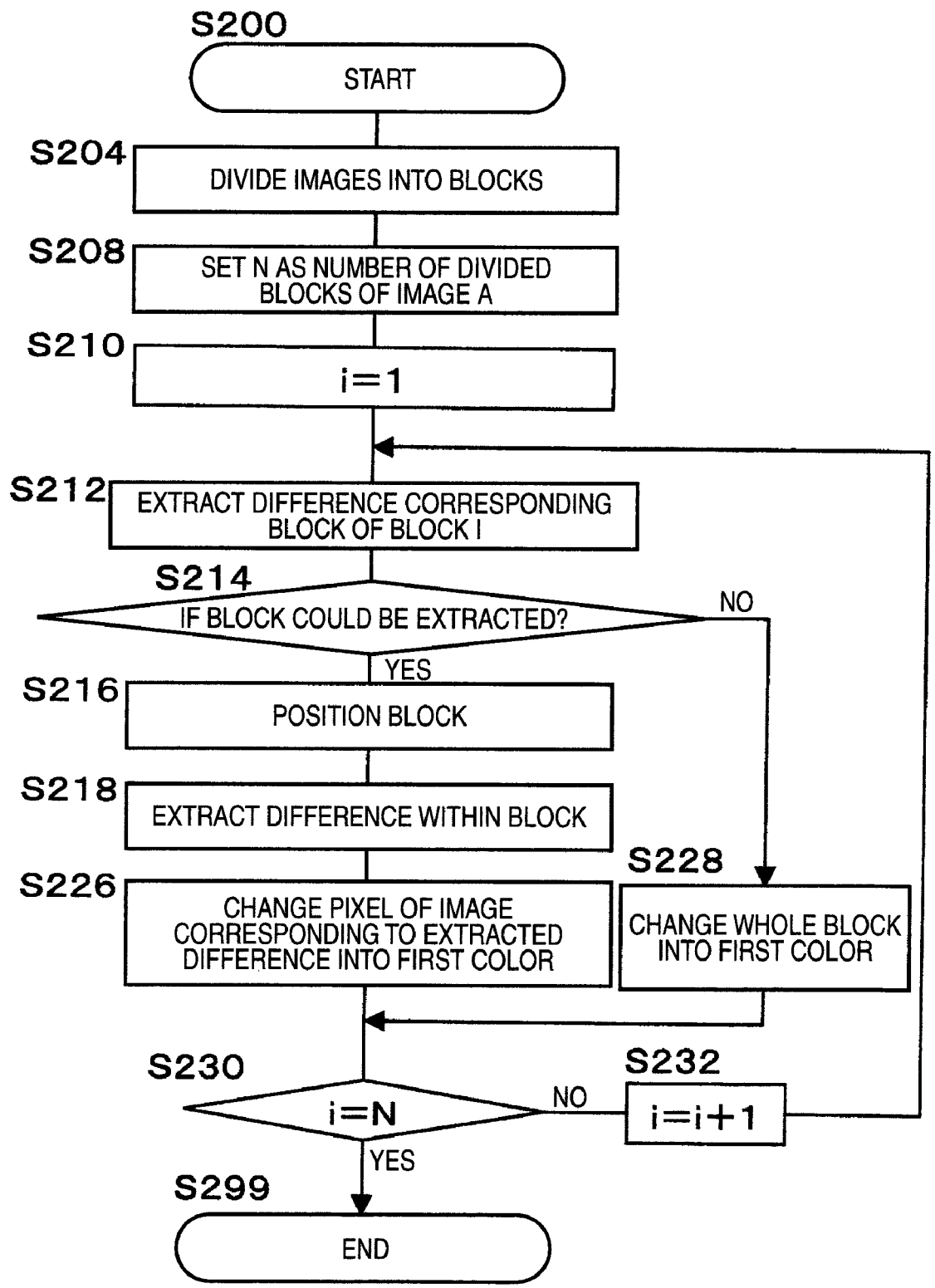
FIG. 2 is a flow chart of a first processing example according to the present embodiment.

FIG. 2 is a flow chart which is used to explain a first processing example according to the present embodiment. Here, description will be given below of processing to be carried out after the image accept module 10 accepts first and second images.

In Step S204, the block division module 22 accepts two images, that is, first and second images from the image accept module 10, and divides them into blocks respectively. More specifically, for example, the block division module 22 carries out a labeling processing (a processing for applying, to pixel areas arranged continuously with each other in a 4-connection manner or the like, labels which can specify uniquely these pixel areas), extracts the labels (pixel areas) larger than a predetermined area, and divides such extracted large labels and small labels contained therein into individual blocks.

Here, as a dividing method to be employed in the labeling processing, there are available two dividing methods. That is, one dividing method, as shown in FIGS. 10 and 11, takes out only the pertinent blocks without changing the size of the whole of the image; and, the other method, as shown in FIGS.

17 and 18, cuts out the images as images which are almost equal in size to the circumscribed rectangles of the blocks.

And, the corresponding block extract module 30 finds out blocks corresponding to the blocks of one image from the blocks of the other image according to Steps S208, S210, S212, S214, S230 and S232. That is, the number of blocks obtained by dividing an image A serving as the first image in Step S204 is expressed as N (Step S208); one of these blocks is fixed (i=1, Step S210); there is extracted the block (difference target block) of an image B serving as the second image corresponding to the block i (Step S212); if extracted (in Step S214, Y), there is extracted a difference between pixels within the block (from Step S216 to Step S226); if not extracted (in Step S214, N), the whole of the block is changed into another color (Step S228); it is checked whether the processing on the block within the image A is ended or not (Step S230); if not ended (in Step S230, N), the next block is selected (i=i+1, Step S232) and the processing goes back to Step S212; and, if ended (in Step S230, Y), there is output an image which is composed of the color changed block (Step S299). Here, a specific processing example to be executed in Step S212 by the corresponding block extract module 30 will be described later with reference to FIG. 5.

In Step S216, the block inside positioning module 41 carries out several processing such as a positioning processing for matching the positions of images in mutually corresponded blocks. In this case, there may also be used a pattern matching technique or a conventional technology disclosed in the Japanese Patent Publication No. 2006-235785 and the like. The pattern matching technique is a technique in which, for two blocks, while shifting the images thereof, there is calculated a correlation coefficient between the two blocks and the positions of the images thereof are matched to each other in the portions where the two blocks are correlated to each other most strongly. On the other hand, in the technology disclosed in the Japanese Patent Publication No. 2006-235785, characters and intersections are extracted and used as reference points, and they are corrected so that they are superimposed to top of each other. When the reference points are made to be superimposed on top of each other, the moving distances of the images are referred to as correction coefficients.

The block inside positioning module 41 may also be structured such that, besides the positioning processing, it carries out an expansion/contraction processing or the like to thereby match the sizes of the image areas to each other. In this case, the expansion/contraction rate is used as the correction coefficient. Here, the term "to superimpose" contains not only a case where the images of the two blocks coincide with each other but also a case where the ratio of the superimposed pixels is equal to or more than a predetermined threshold value. FIG. 13 shows the processing examples that are executed by the block inside positioning module 41.

In Step S218, the difference extract module 42 executes a subtraction processing on the two images to extract a difference between them. Alternatively, however, there may also be used conventional technologies. When making use of technologies disclosed in the Japanese Patent Publications No. 2004-213230, No. 2004-287682 and the like, there is used a method in which each block is further divided into small images and the positions of these small images are corrected individually, thereby extracting a difference between them. FIGS. 14, 15, 20 and 21 respectively show the processing examples that are executed by the difference extract module 42.

In Step S226, the block inside color change module 46 changes the pixels of the image corresponding to the difference extracted in Step S218 to a first color. In this case, only the colors of the pixels extracted through the subtraction operation "the after-corrected image (first image)–before-corrected image (second image)" and the colors of the pixels of extracted through the subtraction operation "the before-corrected image–after-corrected image" (see examples shown in FIGS. 14, 15, 20 and 21) may be changed into the first color; however, as shown in FIGS. 16 and 22, the color may also be changed in the unit of pixel groups(for example, the unit of characters and unit of symbols) including the pixels having the difference. Further, the extraction results of the subtraction operations "before-corrected image–after-corrected image" and "after-corrected image–before-corrected image" may be displayed in a different color.

In Step S228, the block color change module 45 changes the color of the whole of the first block, in which no corresponding block has been found, into a first color. Also, after it is found Y in Step S230, the color of the whole of the second block, in which no corresponding block has been found, may be changed into the first color.

Figure 3:
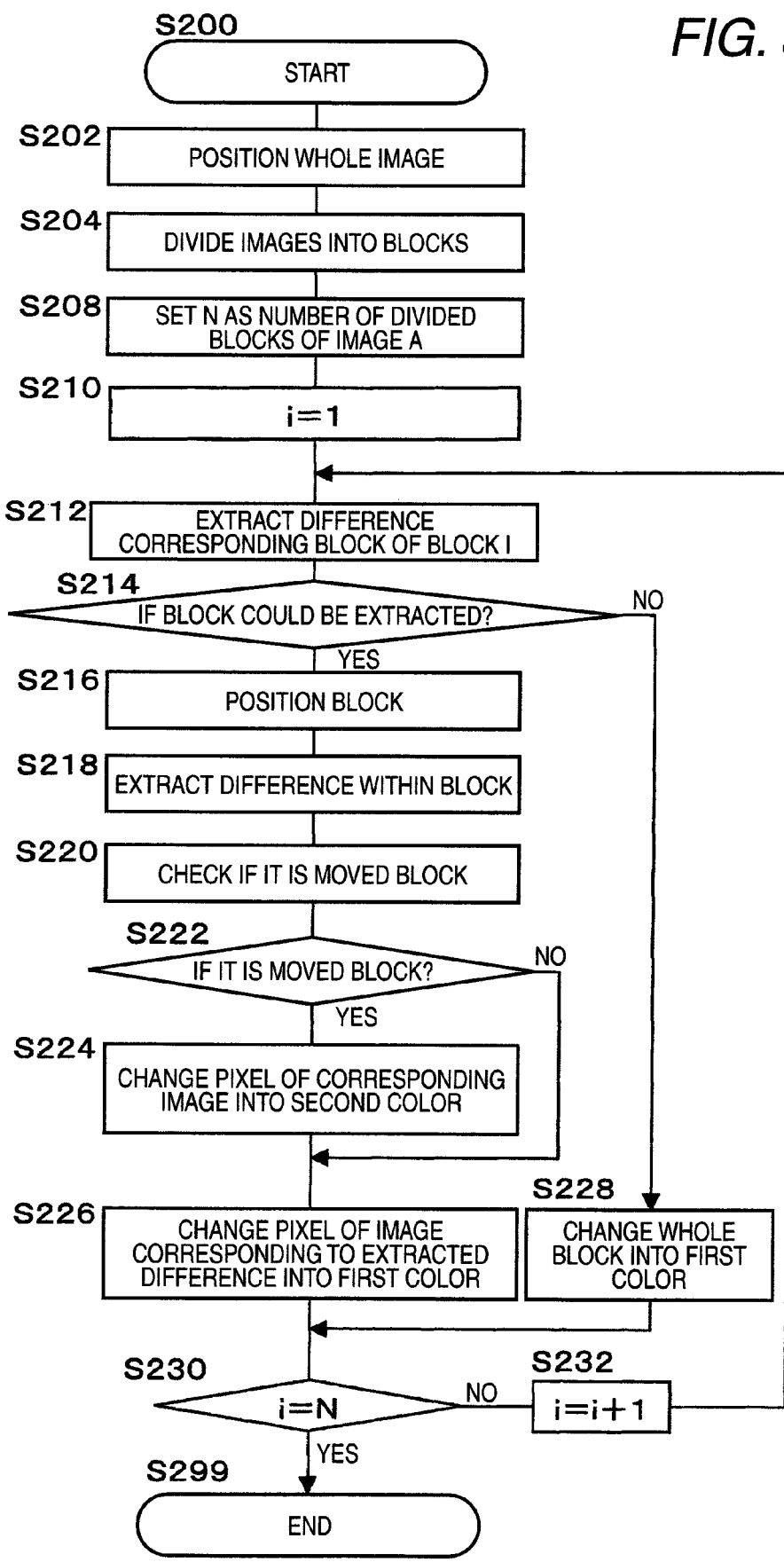
FIG. 3 is a flow chart of a second processing example according to the present embodiment.

FIG. 3 is a flow chart which is used to explain a second processing example according to the present embodiment. That is, between Steps S200 and S204 in the flow chart shown in FIG. 2, there is inserted Step S202; and, between Steps S218 and S226, there are inserted Steps S220, S222 and S224. Therefore, the same steps as in the flow chart shown in FIG. 2 are given the same designations and thus the duplicate description thereof is omitted here.

In Step S202, the preprocessing module 21 receives two images, that is, first and second images from the image accept module 10, and positions the whole of the images. Similarly to Step S216, there may also be used, for example, the pattern matching technique and conventional technology disclosed in the Japanese Patent Publication No. 2006-235785 and the like.

And, in Step S204, a block division processing is carried out on the whole image that has been positioned in Step S202.

In Step S220, the change block check module 43 checks whether the pertinent block has become the corresponding block of the image B after a block in the image A is moved or not. Like examples shown in FIGS. 10 and 11, in a dividing method for taking out the pertinent block without changing the size of the image, it is checked, according to the correction coefficient (the moving distance and the like) calculated when the block positioning processing is executed in Step S216, whether the pertinent block is the moved block or not. Also, like examples shown in FIGS. 17 and 18, when there is cut out an image as an image almost equal in size to the circumscribed rectangle of the block, according to the sum of the shift amount of the cutout position and the correction coefficient of the block positioning, it is checked whether the pertinent block is the moved block or not. As a threshold value used to check whether the block is the moved block or not, there may also be used the values of scan distortion (the maximum value, the most frequent value and the like) that correspond to the respective scanners.

When the processing result in Step S220 shows that the pertinent block is the moved block (in Step S222, Y), the processing advances to Step S224 and, in other case (in Step S222, N), the processing goes to Step S226.

And, in Step S226, the block inside color change module 46 changes the color of the pixels of the image corresponding to the difference extracted in Step S218 into the first color. When it is after the block is changed to the second color in Step S224, the inside of the block provides the first and second colors.

Figure 4:
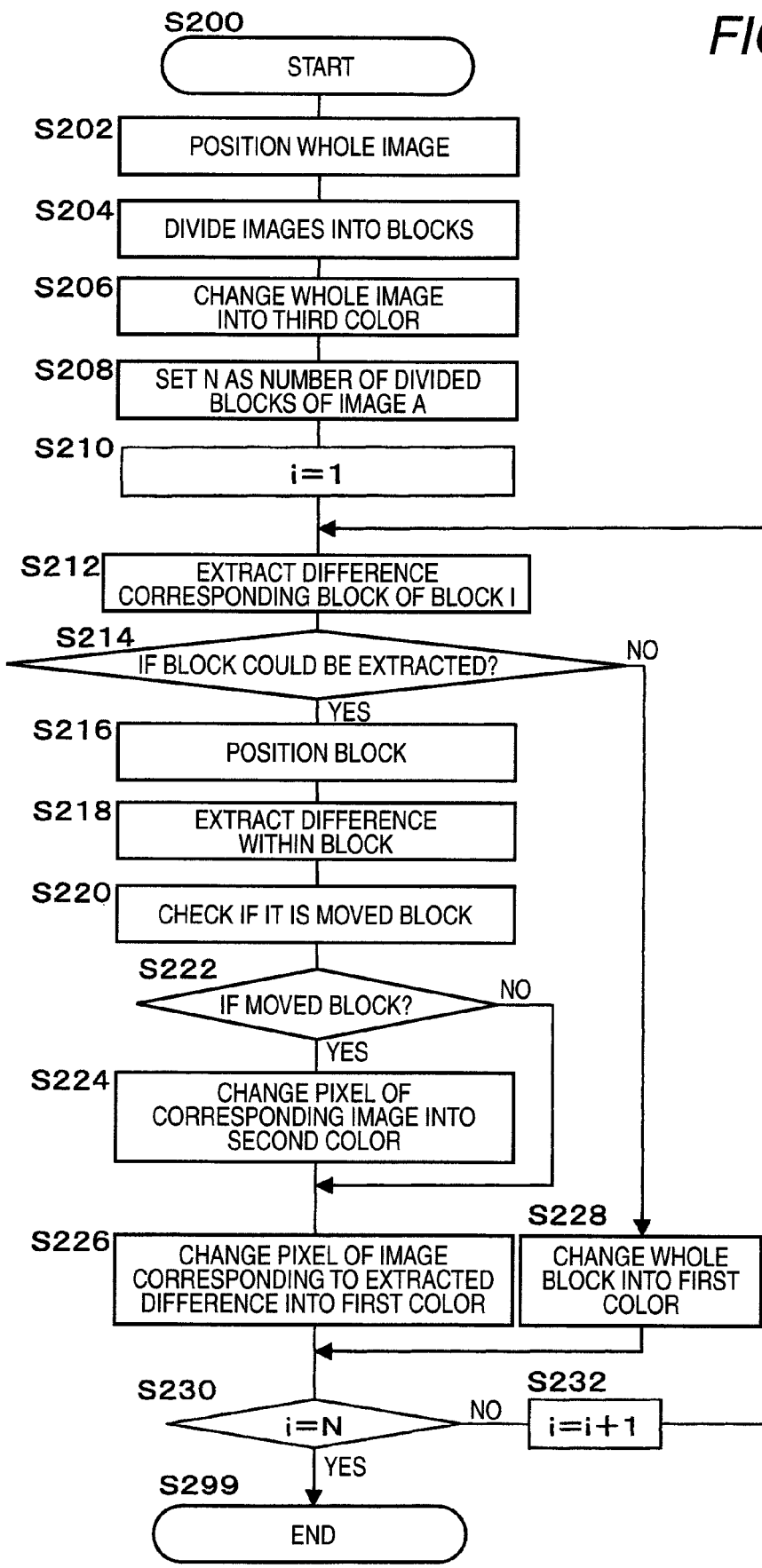
FIG. 4 is a flow chart of a third processing example according to the present embodiment.

FIG. 4 is a flow chart which is used to explain a third processing example according to the present embodiment. Specifically, in this flow chart, between Steps S204 and S208 in the flow chart shown in the example of FIG. 3, there is inserted Step S206. Therefore, the same kinds of steps as in the flow chart for the example shown in FIG. 3 are given the same designations and thus the duplicate description thereof is omitted here.

In Step S206, the color change module 23 changes the color of the whole of an image accepted by the image accept module 10 into a third color. As the processing results of this flow chart, the color of pixels, which raise no difference between the images A and B, is changed to the third color. Alternatively, there may also be employed a structure which, just before the end of the processing, extracts pixels raising no difference between the images A and B and then changes the color of such pixels into the third color. As in Step S206, when the whole of the image is changed to the third color after execution of the processing in Step S204, it is possible to reduce the processing for extracting the pixels with no difference. When the chroma and density of the third color are reduced when compared with the first and second colors, a portion having a difference can be made outstanding. Here, FIG. 22 shows modified examples in which the color of the pixels are changed using the first, second and third colors.

Figure 5:
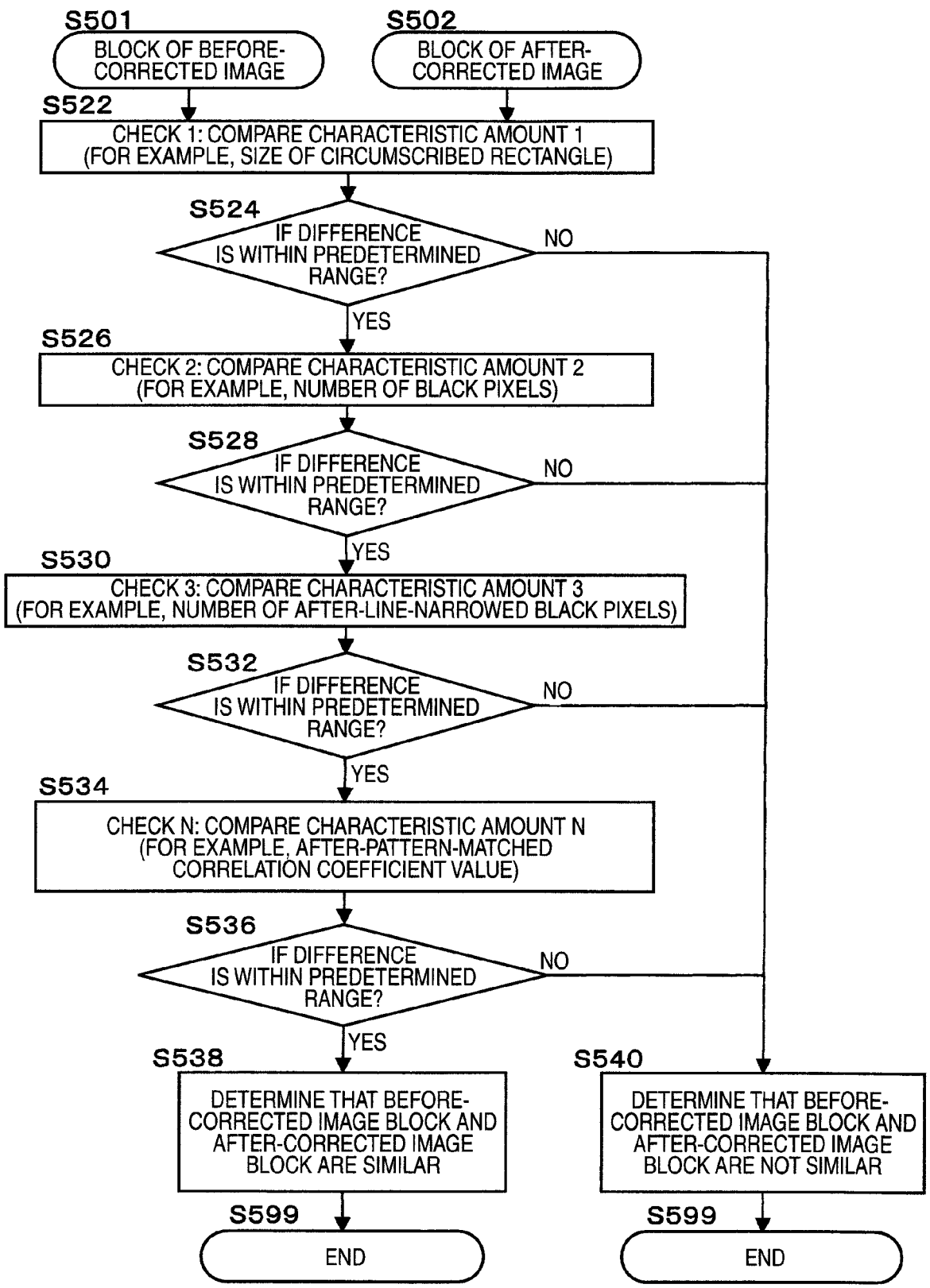
FIG. 5 is an explanatory flow chart of an example of a processing for extracting a difference corresponding block according the present embodiment.

FIG. 5 is a flow chart which is used to explain an example of a processing for extracting a difference corresponding block. That is, this processing example includes a processing example to be executed by the corresponding block extract module 30 and a processing example to be executed in Step S212; and, specifically, the present example checks whether a before-corrected (image A) block (Step S501) and an after-corrected (imageB) block (Step S502) correspond to each other or not. Alternatively, the block correspondence comparison may be made sequentially in order from the characteristic amounts requiring a small load for processing and, when the characteristic amounts are not similar to each other, a processing requiring a large load may not be carried out. Here, in order to compare the characteristic amounts, the corresponding block extract module 30 may execute an extract processing on the characteristic amounts.

In Step S522 (check 1), a characteristic amount 1 (for example, the size of the circumscribed rectangle of a pixel area) is compared.

In Step S524, it is checked whether the comparison result (difference) in Step S522 is within a predetermined range or not. When it is found that the difference is within the predetermined range (in Step S524, Y), the processing goes to Step S526; and, when not (in Step S524, N), the processing goes to Step S540.

In Step S526 (check 2), a characteristic amount 2 (for example, the number of black pixels) is compared.

In Step S528, it is checked whether the comparison result in Step S526 is within a predetermined range or not. When such comparison result is found within the predetermined range (in Step S528, Y), the processing goes to Step S530; and, when not (in Step S528, N), the processing goes to Step S540.

In Step S530 (check 3), a characteristic amount 3 (for example, the number of black pixels after a line is narrowed) is compared.

In Step S532, it is checked whether the comparison result in Step S530 is within a predetermined range or not. When it is found that the comparison result is within the predetermined range (in Step S532, Y), the processing goes to Step S534; and, when not (in Step S532, N), the processing goes to Step S540.

In Step S534 (check N), a characteristic amount N (for example, a correlation numeric value after execution of pattern matching) is compared. In addition to this, the ratio of the vertical length of a pixel area within a block to the horizontal length thereof may also be compared as a characteristic amount.

In Step S536, it is checked whether the comparison result in Step S534 is within a predetermined range or not. When it is found that the comparison result is within the predetermined range (in Step S536, Y), the processing goes to Step S538; and, when not (in Step S536, N), the processing goes to Step S540.

In Step S538, it is determined that the block of the before-corrected image and the block of the after-corrected image are similar to each other.

In Step S540, it is determined that the block of the before-corrected image and the block of the after-corrected image are not similar to each other.

Here, it may also be employed a structure in which, when the block positioning processing in Step S216 cannot be carried out, the corresponding processing in Step S212 can be executed again.

Figure 6A:
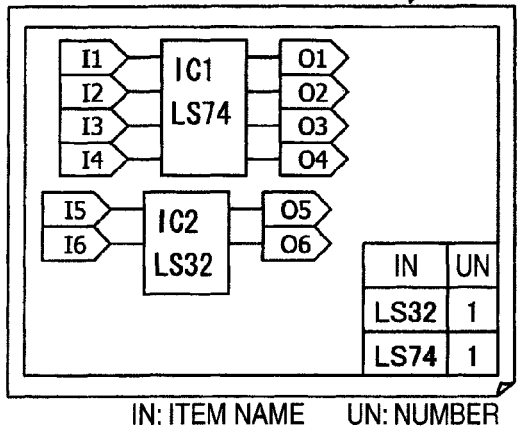
FIGS. 6A and 6B are explanatory views of an example of two images to be accepted by an image accept module.
Figure 6B:
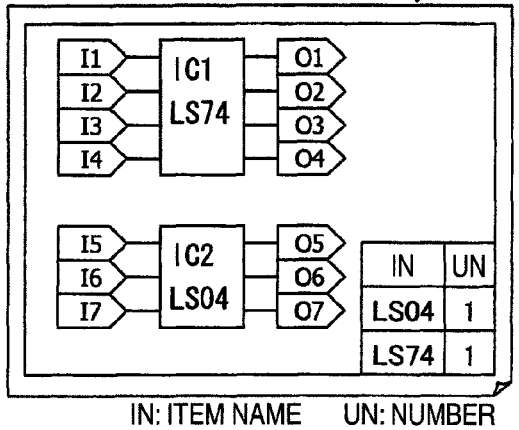

FIG. 6 is an explanatory view of two examples respectively for two images to be accepted by the image accept module 10. Specifically, the example of FIG. 6A shows a before-corrected image 610, whereas the example of FIG. 6B shows an after-corrected image 620. In the after-corrected image 620, the character and sign of a block arranged in the lower left portion of the before-corrected image 610 are corrected ([32] is corrected to [04]); ([17] and [07]) is added to the block of the image 610; and further, the blocks are moved in the right downward direction. Also, a character within a part table situated in the right downward portion is corrected ([32] is corrected to [004]).

Figure 7A:
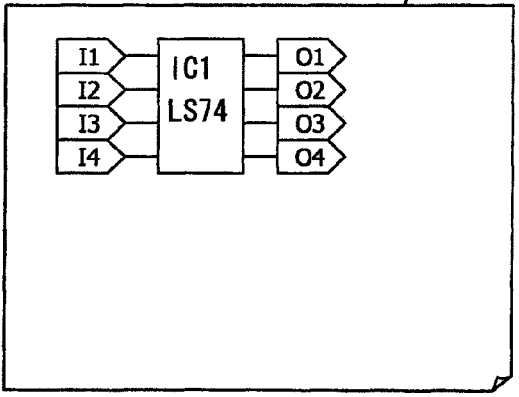
FIGS. 7A and 7B are explanatory views of an example in which there has been extracted a block different from a coincident block.
Figure 7B:
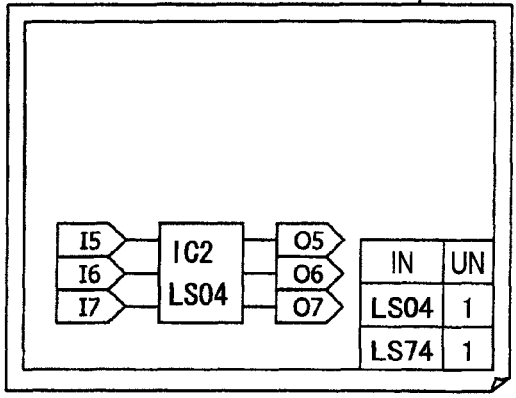

FIG. 7 is an explanatory view of an example in which a block different from a coincident block is extracted. Specifically, a coincident image 621 shown in an example in FIG. 7A shows a block in which the before-corrected image 610 and after-corrected image 620 coincide with each other, whereas a difference image 622 shown in an example in FIG. 7B shows a block in which the before-corrected image 610 and after-corrected image 620 do not coincide with each other. Here, although not shown in these examples, even when the character or sign of a block is not corrected, any character or sign is not added thereto, but the block is simply blocked, it is regarded as a block which is not coincident.

Figure 8A:
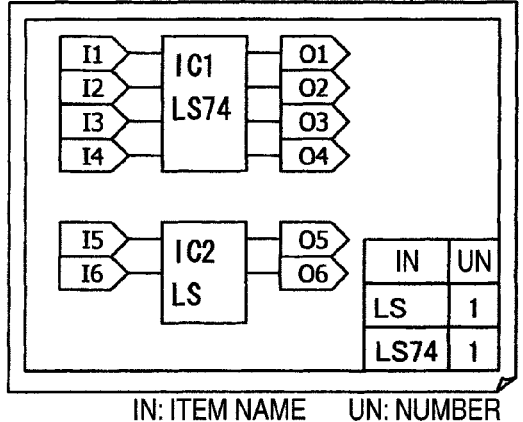
FIGS. 8A and 8B are explanatory views of an example in which a different pixel is extracted.
Figure 8B:
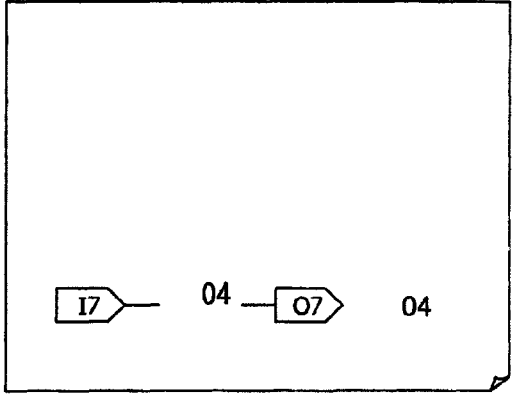

FIG. 8 is an explanatory view of an example in which a different pixel is extracted. A coincident image 623 shown in an example in FIG. 8A shows a pixel portion in which the before-corrected image 610 and after-corrected image 620 coincide with each other; and, a difference image 624 shown in an example in FIG. 8B shows a pixel portion in which a difference image 622 is different from the before-corrected image 610. By the way, the different pixel portion used here means a pixel area (which is a pixel group and, as a result, provides a character unit, a sign unit, a similar unit and the like).

FIG. 9 is an explanatory view of an example in which a pixel portion where neither positions nor the pixels thereof are changed, a pixel portion where only the positions have been changed, and a pixel portion to which entry has been added and on which a correction been made, are divided and extracted.

Figure 9A:
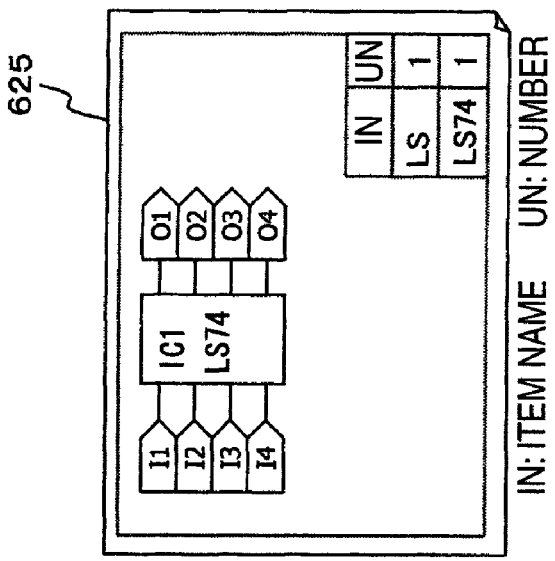
FIGS. 9A to 9C are explanatory views of an example in which there is extracted a pixel different from the coincident block and different block.
Figure 9B:
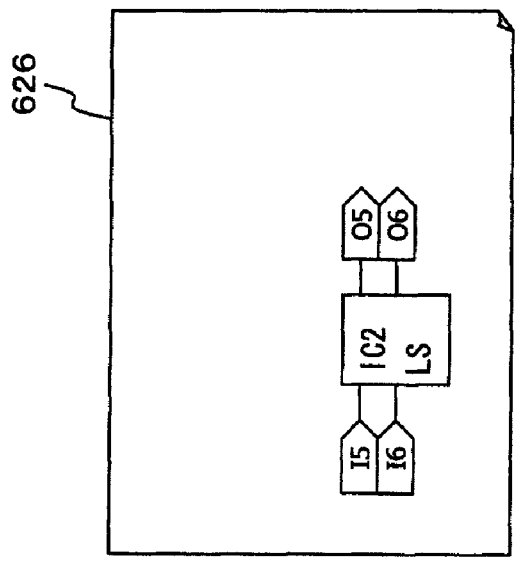
Figure 9C:
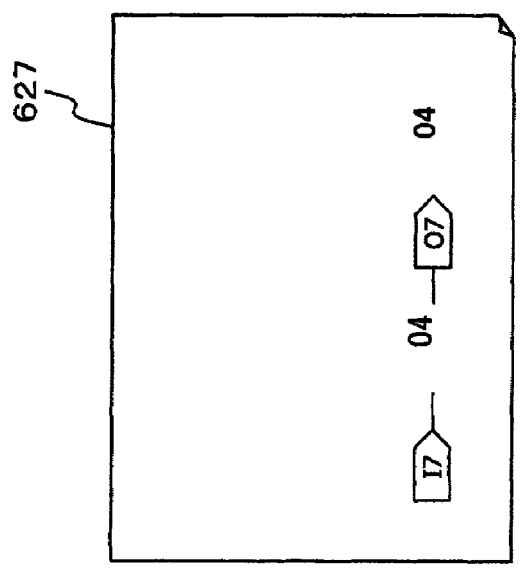

A coincident image 625 displayed in an example in FIG. 9A shows a pixel portion in which neither the positions of the before-corrected image 610 and after-corrected image 620 nor the pixels thereof are changed, while such pixel portion is shown in a third color. A difference image 626 displayed in an example in FIG. 9B shows a pixel portion in which the difference image 622 is different only in position from the before-corrected image 610, while such pixel portion is shown in a second color. A difference image 627 displayed in an example in FIG. 9C shows a pixel portion to which entry has been added and on which a correction has been made, while such pixel portion is shown in a first color.

FIG. 10 is an explanatory view of an example of a processing to be executed on the before-corrected image 610 by the block division module 22. That is, the before-corrected image 610 (FIG. 10A) is divided by the block division module 22 into a before-corrected block A1011 (FIG. 10B), a before-corrected block B1012 (FIG. 10C) and a before-corrected block C1013 (FIG. 10D).

FIG. 11 is an explanatory view of an example of a processing to be executed on the after-corrected image 620 by the block division module 22. That is, the after-corrected image 620 (FIG. 11A) is divided by the block division module 22 into an after-corrected block A1121 (FIG. 11B), an after-corrected block C1122 (FIG. 11C) and an after-corrected block C1123 (FIG. 11D).

These are the examples in which the block division module 22 employs a dividing method for taking out only the pertinent blocks without changing the size of the whole of the image.

Figure 12:
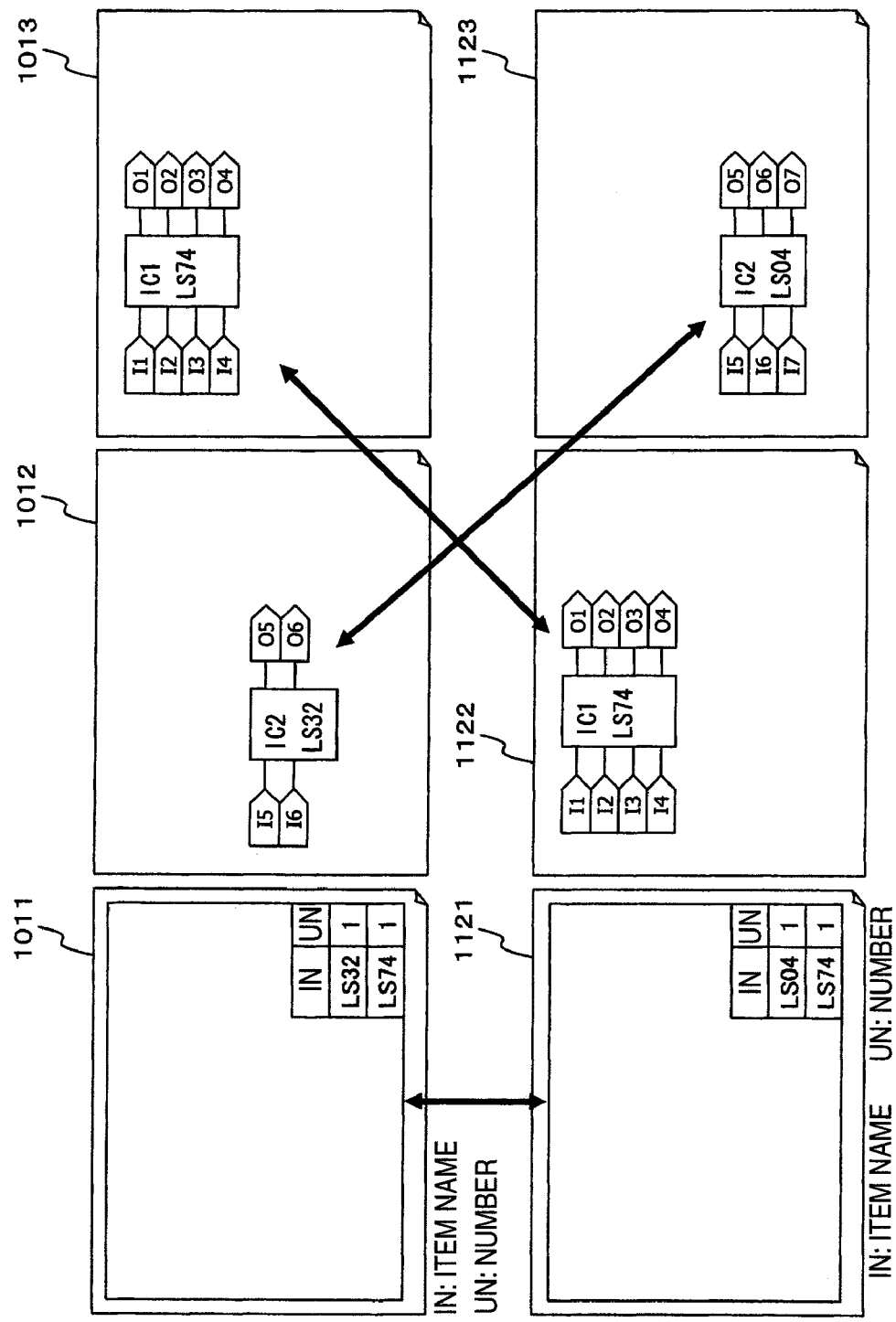
FIG. 12 is an explanatory view of an example of a processing to be executed by a corresponding block extract module.

FIG. 12 is an explanatory view of an example of a processing to be executed by the corresponding block extract module 30. That is, the corresponding block extract module 30 extracts, from the first and second blocks, sets of blocks that are similar to each other, for example, according to the flow chart shown in FIG. 5. FIG. 12 shows the following corresponding relationships: that is, the before-corrected block A1011 and after-corrected block A1121 correspond to each other; the before-corrected block B1012 and after-corrected block C1123 correspond to each other; and, the before-corrected block C1013 and after-corrected block B1122 correspond to each other, respectively.

FIG. 13 is an explanatory view of an example of a processing to be executed by a block inside positioning module 41. The block inside positioning module 41, as shown in FIG. 13, compares the before-corrected block B1012 and after-corrected block C1123 and moves the before-corrected block B1012 in the right downward direction in combination with the after-corrected block C1123 to thereby generate an after-moved block B1302. Here, since the before-corrected block 1011 and after-corrected block A1121 are compared with each other and it is found that no relative movement has been made between them, the before-corrected block 1011 is copied to there by generate the after-moved block A1301. Similarly, since the before-corrected block C1013 and after-corrected block B1122 are compared with each other and it is found that no relative movement has been made between them, the before-corrected block C1013 is copied to thereby generate an after-moved block C1303.

FIG. 14 is an explanatory view of a first processing example to be executed by the difference extract module 42. That is, FIG. 14 shows that the difference extract module 42 generates an image as the result of execution of a subtraction operation "an after-corrected image–a before-corrected image. Specifically, a difference block A1401 shown in the example of FIG. 14A is an image obtained when an after-moved block A1301 is subtracted from an after-corrected block A1121 (the pertinent black pixel is turned into white); a difference block B1402 shown in the example of FIG. 14B is an image obtained when an after-moved block C1302 is subtracted from an after-corrected block C1123; and, a difference block C1403 shown in the example of FIG. 14C is an image obtained when an after-moved block C1303 is subtracted from an after-corrected block B1122.

FIG. 15 is an explanatory view of a second processing example to be executed by the difference extract module 42. That is, FIG. 15 shows that the difference extract module 42 generates an image as the result of execution of a subtraction operation "a before-corrected image–an after-corrected image". A difference block A1501 shown in the example of FIG. 15A is an image obtained when an after-corrected block A1121 is subtracted from an after-moved block A1301; a difference block B1502 is an image obtained when an after-corrected block C1123 is subtracted from an after-moved block B1302; a difference block C1503 is an image obtained when an after-corrected block B1122 is subtracted from a after-moved block C1303.

Figure 16A:
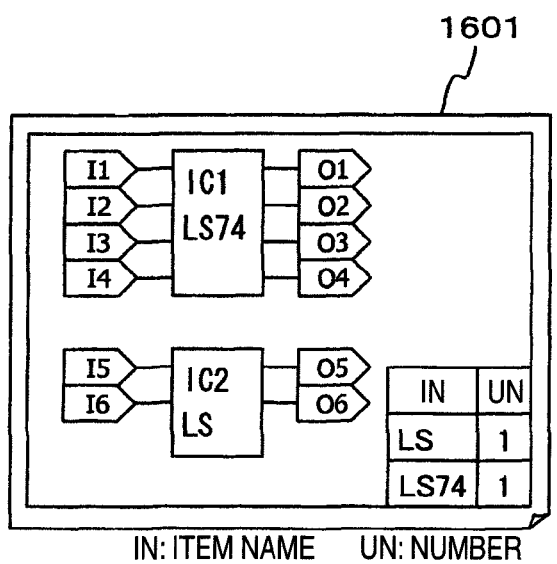
FIGS. 16A and 16B are explanatory views of an example of a coincident image and a difference image.
Figure 16B:
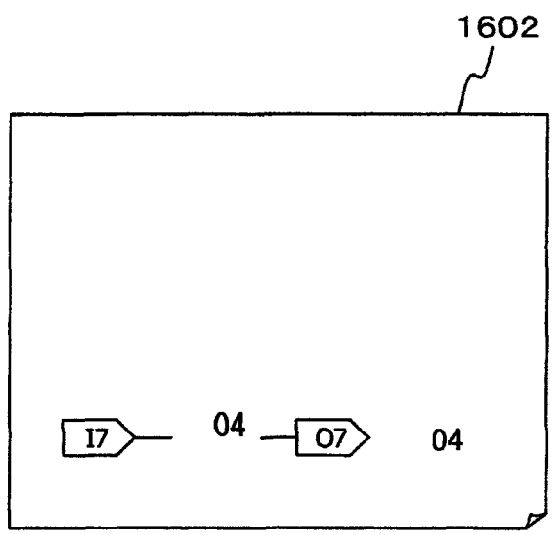
Figure 18D:
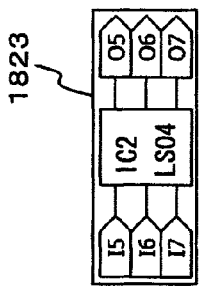
FIGS. 18A to 18D are explanatory views of another processing example to be executed on the after-corrected image by the block division module.
Figure 18C:
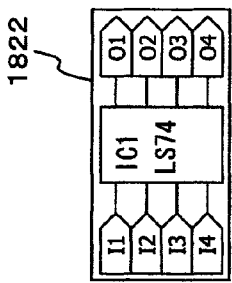
Figure 18B:
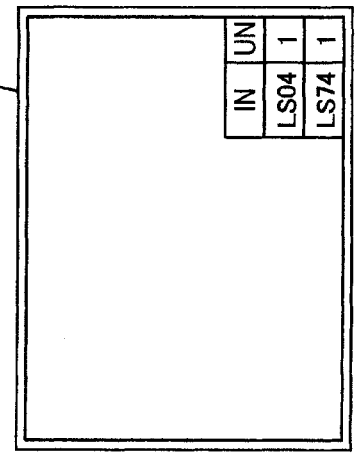
Figure 18A:
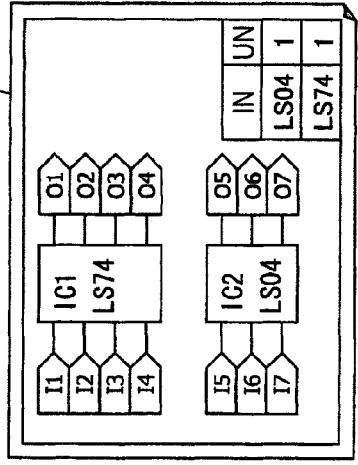

FIG. 16 is an explanatory view of examples of a coincident image 1601 and a difference image 1602. That is, the difference image 1602 shown in the example of FIG. 16B is an image which is generated when the difference extract module 42 extracts a difference image from the image shown in the example of FIG. 14 or FIG. 15. Here, the coincident image 1601 shown in the example of FIG. 16A is an image which is obtained when other image than the difference image 1602 is extracted from an after-corrected image 620.

FIG. 17 is an explanatory view of another example of the processing which is carried out on the before-corrected image 610 by the block division module 22. That is, the before-corrected image 610 is divided by the block division module 22 into a before-corrected block A1711 (FIG. 17B), a before-corrected block B1712 (FIG. 17C), and a before-corrected block C1713 (FIG. 17D).

And, FIG. 18 is an explanatory view of another example of the processing which is executed on the after-corrected image 620 by the block division module 22. That is, the after-corrected image 620 (FIG. 18A) is divided by the block division module 22 into an after-corrected block A1821 (FIG. 18B), an after-corrected block B1822 (FIG. 18C), and an after-corrected block C1823 (FIG. 18D).

These are the processing which are executed when the block division module 22 employs a division method for cutting out an image substantially equal in size to the circumscribed rectangle of a block.

Figure 19:
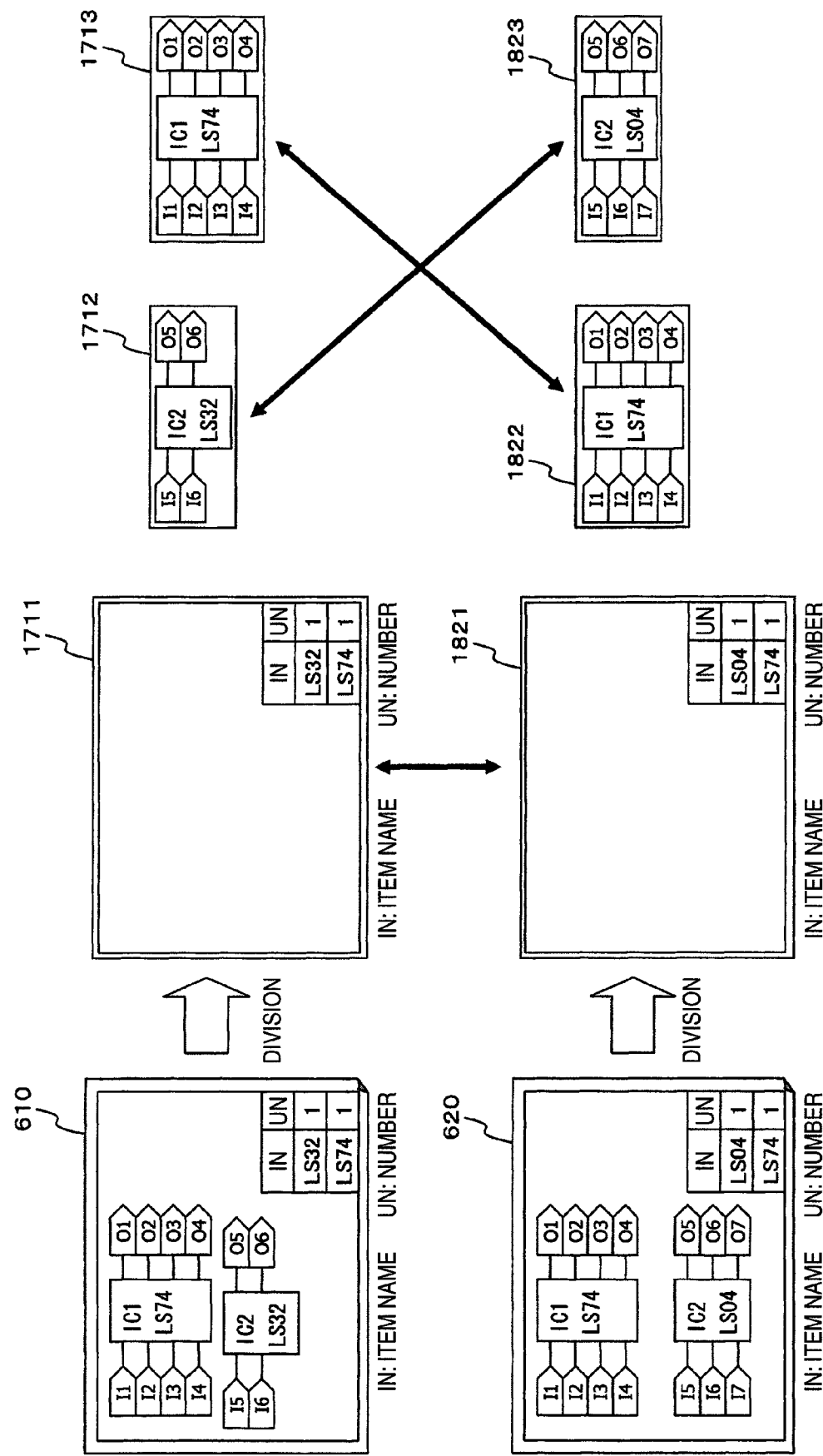
FIG. 19 is an explanatory view of another processing example to be executed by the corresponding block extract module.

FIG. 19 is an explanatory view of another example of the processing to be executed by the corresponding block extract module 30. That is, the corresponding block extract module 30, for example, according to the flow chart shown in FIG. 5, extracts sets of blocks that, between first and second blocks, are similar to each other. FIG. 19 shows the following corresponding sets: that is, a before-corrected block A1711 and an after-corrected block A1821 correspond to each other; a before-corrected block B1712 and an after-corrected block C1823 correspond to each other; and, a before-corrected block C1713 and an after-corrected block B1822 correspond to each other, respectively.

Figure 20C:
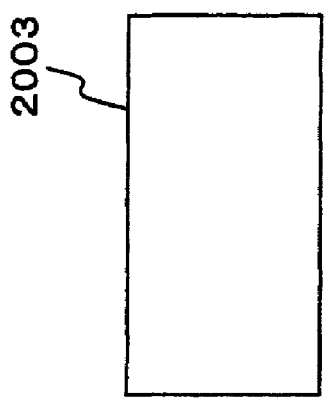
FIGS. 20A to 20C are explanatory views of another example of the first processing to be executed by the difference extract module.
Figure 20B:
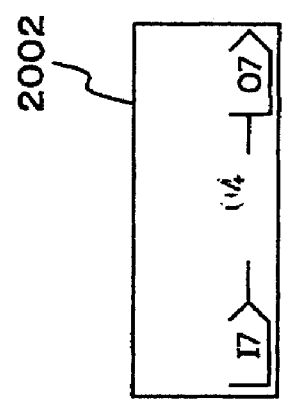
Figure 20A:
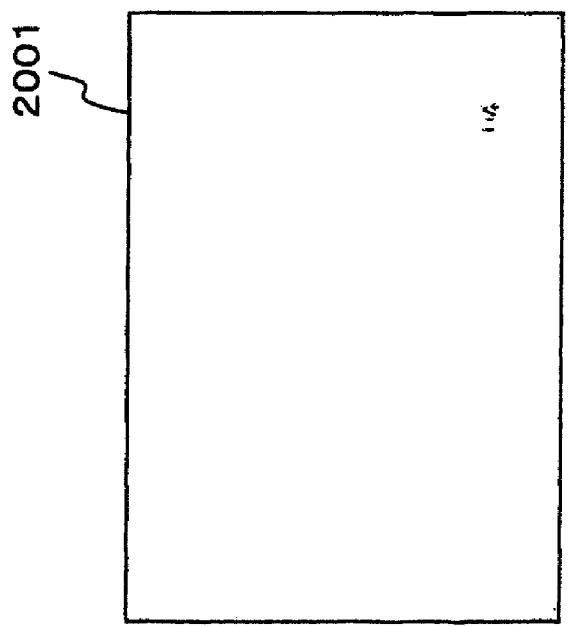

FIG. 20 is an explanatory view of a first example of another processing which is carried out by the difference extract module 42. That is, FIG. 20 shows that the difference extract module 42 generates an image as the result of execution of a subtracting operation "an after-corrected image–a before-corrected image". Specifically, a difference block A2001 shown in the example of FIG. 20A is an image obtained when a before-corrected block A1711 is subtracted from an after-corrected block A1821; a difference block B2002 is an image obtained when a before-corrected block B1712 is subtracted from an after-corrected block C1823; and, a difference block C2003 shown in the example of FIG. 20C is an image obtained when a before-corrected block C1713 is subtracted from an after-corrected block B1822.

Figure 21C:
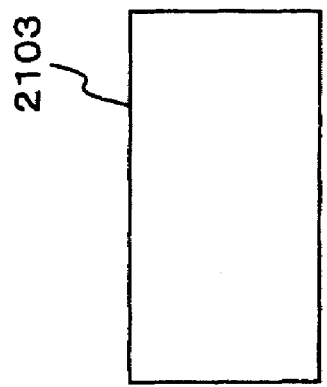
FIGS. 21A to 21C are explanatory views of another example of the second processing to be executed by the difference extract module.
Figure 21B:
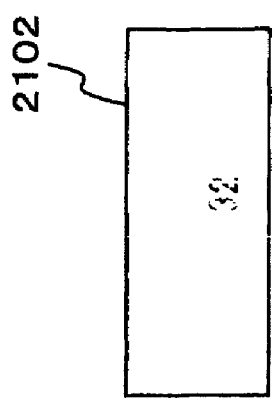
Figure 21A:
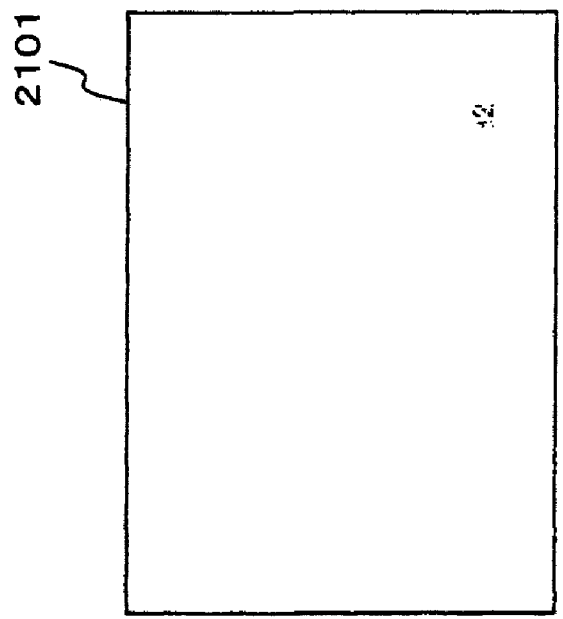

FIG. 21 is an explanatory view of a second example of another processing which is carried out by the difference extract module 42. That is, FIG. 21 shows that the difference extract module 42 generates an image as the result of execution of a subtracting operation "a before-corrected image–an after-corrected image". Specifically, a difference block A2101 shown in the example of FIG. 21A is an image obtained when an after-corrected block A1821 is subtracted from a before-corrected block A1711; a difference block B2102 shown in the example of FIG. 21B is an image obtained when an after-corrected block C1823 is subtracted from a before-corrected block B1712; and, a difference block C2103 shown in the example of FIG. 21C is an image obtained when an after-corrected block B1822 is subtracted from a before-corrected block C1713.

FIG. 22 is an explanatory view of examples of a processing to be executed according to the present embodiment.

A target image 2210 shown in the example of FIG. 22A is an image obtained when the after-corrected image 620 is changed into a third color by the color change module 23. Specifically, although, in the example shown in FIG. 22A, the target image is shown in black solid lines, by reducing the chroma of the image, the image is changed into a grey color or it is shown in dotted lines.

A target image 2221 shown in the example of FIG. 22B2 is a block the color of which has been changed to a second color (for example, green) by the block color change module 45. Here, a coincident block 2220 shown in the example of FIG. 22B1 provides an image obtained when the difference block 2221 is deleted from the target image 2210. That is, it is a block coincident image.

A difference pixel area 2232 shown in the example of FIG. 22C3 is a pixel area the color of which has been changed into a first color (for example, red) by the block inside color change module 46. Here, a coincident pixel block 2230 shown in FIG. 22C1 provides an image obtained when the difference pixel area 2232 is deleted from the coincident block 2220. That is, this is an image in which blocks and pixels within the blocks are coincident with each other. Also, a difference block 2231 shown in the example of FIG. 22C2 is equivalent to the difference block 2221; however, the difference pixel area 2232 is to be overwritten on the difference block 2231. That is, when the coincident pixel block 2230, difference block 2231 and difference pixel area 2232 are provided as a sheet of image, the difference block 2231 is overwritten on the coincident pixel block 2230, and the difference pixel area 2232 is overwritten on the difference block 2231. And, an image, which is composed of the three superimposed sheets, is output by the image output module 50.

Now, description will be given below of an example of a hardware structure according to the present embodiment with reference to FIG. 23. The structure shown in FIG. 23 is made of, for example, a personal computer (PC) and includes a data read portion 2317 such as a scanner and a data output portion 2318 such as a printer.

A CPU (Central Processing Unit) 2301 is a control portion for executing processing according to a computer program which describes the execution sequences of various modules described in the above embodiment, that is, the block division & c. processing module 20, corresponding block extract module and block inside processing module 40.

A ROM (Read Only Memory) 2302 stores therein programs, parameters and the like which are used by the CPU 2301. ARAM (Random Access Memory) 2303 difference pixel area 2232 stores therein programs which are used in the processing execution of the CPU 2301, parameters which vary properly in such processing execution, and the like. These composing elements are connected to each other through a host bus 2304 which is composed of a CPU bus and the like.

The host bus 2304 is connected through a bridge 2305 to an external bus 2306 such as a PCI (Personal Component Interconnect/Interface) bus.

A keyboard 2308 and a pointing device 2309 such as a mouse are input devices which can be operated by an operator. A display 2310 is a liquid crystal device or a CRT (Cathode Ray Tube) or the like, and it displays thereon various pieces of information as a text or image information.

An HDD (Hard Disk Drive) 2311 incorporates a hard disk therein and drives the hard disk to record or reproduce programs and information which are executed by the CPU 2301. In the hard disk, there can be stored an image accepted by the image accept module 10, images obtained as the results of the processing executed by the corresponding block extract module 30 and the like, and other similar images. Further, in the hard disk, there can be stored other various computer programs such as various data processing programs.

A drive 2312 reads out data or programs recorded in a removable recording medium 2313 such as a magnetic disk, a magneto-optical disk or a semiconductor memory, and supplies such data and programs to the RAM 2303 connected thereto through an interface 2307, external bus 2306, bridge 2305 and host bus 2304. The removable recording medium 2313 can also be used as a data recording area similar to a hard disk.

A connecting port 2314 is a port which is used to connect external connecting equipment 2315 and includes a connecting portion for a USB, IEEE1394 and the like. The connecting port 2314 is connected to the CPU 2301 and the like through the interface 2307, external bus 2306, bridge 2305, host bus 2304 and the like. A communication portion 2316 is connected to a network and executes a data communication processing between external equipment and itself. A data read portion 2317 is, for example, a scanner and carries out a document reading processing. A data output portion 2318 is, for example, a printer and executes a document data output processing.

Here, the hardware structure shown in FIG. 23 is just an example; and thus, the present embodiment is not limited to the structure shown in FIG. 23, but there can be employed any other structure, provided that it is able to execute the modules described hereinabove in the present embodiment. For example, some of the modules may also be composed of a specific type of hardware (for example, Application Specific Integrated Circuit: ASIC); and, some of the modules may also be disposed within an external system and may be connected through a communication line. Further, two or more systems shown in FIG. 23 may be connected to each other through a communication line such that they can cooperate together in executing a common operation. Also, the structure may also be incorporated into a copying machine, a fax, a scanner, a printer, a composite machine (an image processing apparatus having two or more functions of a scanner, a printer, a copying machine, a fax and the like), and a similar apparatus.

Here, the above-described programs may also be stored into a recording medium before they are supplied, or such programs may also be provided through communication unit. In this case, for example, the above-described programs may also be considered as the invention relating to "a computer readable recording medium which has recorded programs therein".

The expression "a computer readable recording medium which has recorded programs therein" means a recoding medium which has recorded programs therein and can be read by a computer.

Here, the recoding medium includes: a digital versatile disk (DVD) such as "DVD-R, DVD-RW, DVD-RAM and the like" which meet the standard that is specified by the DVD forum, and "DVD+R, DVD+RW and the like" meeting the standard specified by the DVD+RW; a compact disk (CD) such as a read only memory (CD-ROM), a CD recordable (CD-R), a CD rewritable (CD-RW), and the like; a blue-ray disk; a magneto-optical disk (MO); a flexible disk (FD); a magnetic tape; a hard disk; a read only memory (ROM); an electrically erasable and rewritable read only memory (EEPROM); a flash memory; a random access memory (RAM); and, other similar medium.

And, the above-mentioned program and a portion thereof may also be recorded in the above-mentioned recording medium and thus may be stored and circulated. Also, the program and a portion thereof may also be transmitted through communication, for example, using a local area network (LAN), a metropolitan area network (MAN), a wide area network (WAN), a cable network for use in an internet, intranet, extranet and the like, or a radio communication network, and a combination of the above; or they may also be carried on carrier waves.

Further, the above-mentioned program may also be a portion of another program, or may be recorded into a recording medium together with a separate program. Also, it may also be divided and recorded into two or more recording mediums. And, it may also be recorded in any mode, for example, it may be compressed or enciphered, provided that it can be restored.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image processing apparatus comprising:
    an image dividing unit that divides a first image and a second image into a plurality of first divided images and a plurality of second divided images, respectively;
    a corresponding divided image extract unit that extracts the second divided images corresponding to the first divided images;
    a difference extract unit that extracts a difference image having a difference generated due to additional entry or extraction between pixels included within each of the first divided images and pixels included within each of the second divided images;
    a first change unit that, in a case where the first divided images has such a movement relationship that it can be moved relative to the second divided images, changes a color of the second divided images into a first color;
    a second change unit that changes a color of the difference image extracted by the difference extract unit into a second color; and
    an image output unit that outputs the second divided images with the color changed by the first change unit and the difference image with the color changed by the second change unit.

2. The image processing apparatus as claimed in claim 1, wherein the second change unit changes the second divided images, which are not extracted by the corresponding divided image extract unit, into a second color.

3. The image processing apparatus as claimed in claim 1, further comprising a third change unit that, in a case where a difference is not extracted by the difference extract unit and the first divided image does not have the movement relationship, changes the second divided images into a third color.

4. The image processing apparatus as claimed in claim 1, wherein the third color is lower in chroma and density than the first and second colors.

5. An image processing method comprising:
    dividing, by a processor, a first image and a second image into a plurality of first divided images and a plurality of second divided images, respectively;
    extracting the second divided images corresponding to the first divided images;
    extracting a difference image having a difference generated due to additional entry or extraction between pixels included within each of the first divided images and pixels included within each of the second divided images;
    changing, in a case where each of the first divided images has such a movement relationship that it can be moved relative to each of the second divided images, a color of the second divided images into a first color;
    changing a color of the extracted difference image into a second color; and
    an image output unit that outputs the second divided images with the changed color and the difference image with the changed color.

6. A non-transitory computer readable medium storing a program causing a computer to execute a process for performing image processing, the process comprising:
    dividing a first image and a second image into a plurality of first divided images and a plurality of second divided images, respectively;
    extracting the second divided images corresponding to the first divided images;
    extracting a difference image having a difference generated due to additional entry or extraction between pixels included within each of the first divided images and pixels included within each of the second divided images;
    changing, in a case where each of the first divided images has such a movement relationship that it can be moved relative to each of the second divided images, a color of the second divided images into a first color;
    changing a color of the extracted difference image into a second color; and
    an image output unit that outputs the second divided images with the changed color and the difference image with the changed color.

* * * * *